(12) United States Patent
Nakata

(10) Patent No.: US 7,378,757 B2
(45) Date of Patent: May 27, 2008

(54) POWER GENERATION SYSTEM

(75) Inventor: Josuke Nakata, Kyoto (JP)

(73) Assignee: Kyosemi Corporation, Kyoto (JP)

( * ) Notice: Subject to any disclaimer, the term of this patent is extended or adjusted under 35 U.S.C. 154(b) by 43 days.

(21) Appl. No.: 10/554,037

(22) PCT Filed: Jun. 9, 2003

(86) PCT No.: PCT/JP03/07298

§ 371 (c)(1),
(2), (4) Date: Nov. 17, 2005

(87) PCT Pub. No.: WO2004/109890

PCT Pub. Date: Dec. 16, 2004

(65) Prior Publication Data

US 2007/0034246 A1  Feb. 15, 2007

(51) Int. Cl.
*H02J 1/00* (2006.01)
*H02J 3/00* (2006.01)
*H02J 7/00* (2006.01)

(52) U.S. Cl. .................. 307/71; 320/101; 320/116; 320/117; 320/121

(58) Field of Classification Search ............... 320/101, 320/116, 117, 121; 307/71
See application file for complete search history.

(56) References Cited

U.S. PATENT DOCUMENTS

| | | | |
|---|---|---|---|
| 3,038,952 A | 6/1962 | Ralph |
| 3,350,775 A | 11/1967 | Peter |
| 3,433,676 A | 3/1969 | Stein |
| 3,998,659 A | 12/1976 | Wakefield |
| 4,021,323 A | 5/1977 | Kilby et al. |
| 4,126,812 A | 11/1978 | Wakefield |
| 4,175,249 A | * 11/1979 | Gruber | 323/271 |
| 4,224,081 A | 9/1980 | Kawamura et al. |
| 4,238,820 A | 12/1980 | Naaijer |

(Continued)

FOREIGN PATENT DOCUMENTS

EP  0 866 506  9/1998

(Continued)

OTHER PUBLICATIONS

U.S. Appl. No. 10/169,017, Nakata.

(Continued)

*Primary Examiner*—Gary L Laxton
*Assistant Examiner*—Ramy Ramadan
(74) *Attorney, Agent, or Firm*—Jordan and Hamburg LLP

(57) ABSTRACT

A power generating system includes a power generator generating DC power, and an inverter circuit for converting DC power into AC power. The power generator has a plurality of power generating modules each including a plurality of power generating units and at least one electric storage device connected to each of the plurality of power generating modules. A plurality of first switch devices connect/disconnect each of positive electrodes of the plurality of power generating modules to/from a positive bus, a plurality of second switch devices connect/disconnect each of the positive electrodes of the plurality of power generating modules to/from negative electrodes of the power generating modules which are contiguous to one side, a plurality of third switch devices connect/disconnect each of the negative electrodes to/from a negative bus, and the DC output voltage can be increased/decreased stepwise by switching the switch devices.

18 Claims, 17 Drawing Sheets

U.S. PATENT DOCUMENTS

| | | | |
|---|---|---|---|
| 4,521,640 A | 6/1985 | Levine | |
| 4,581,103 A | 4/1986 | Levine et al. | |
| 4,582,588 A | 4/1986 | Jensen et al. | |
| 4,583,588 A | 4/1986 | Franzolini et al. | |
| 4,691,076 A | 9/1987 | Levine et al. | |
| 5,009,719 A | 4/1991 | Yoshida | |
| 5,028,546 A | 7/1991 | Hotchkiss | |
| 5,419,782 A | 5/1995 | Levine et al. | |
| 5,428,249 A | 6/1995 | Sawayama et al. | |
| 5,431,127 A | 7/1995 | Stevens | |
| 5,455,884 A * | 10/1995 | Yang | 388/803 |
| 5,469,020 A | 11/1995 | Herrick | |
| 5,498,576 A | 3/1996 | Hotchkiss et al. | |
| 5,538,902 A | 7/1996 | Izu et al. | |
| 5,720,827 A | 2/1998 | Simmons | |
| 5,925,897 A | 7/1999 | Oberman | |
| 5,977,659 A | 11/1999 | Takehara et al. | |
| 6,198,037 B1 | 3/2001 | Nakata | |
| 6,204,545 B1 | 3/2001 | Nakata | |
| 6,265,242 B1 | 7/2001 | Komori et al. | |
| 6,268,559 B1 * | 7/2001 | Yamawaki | 136/244 |
| 6,268,710 B1 * | 7/2001 | Koga | 320/116 |
| 6,281,427 B1 * | 8/2001 | Mitsuhiro et al. | 136/250 |
| 6,294,822 B1 | 9/2001 | Nakata | |
| 6,355,873 B1 | 3/2002 | Ishikawa | |
| 6,399,412 B1 | 6/2002 | Asai et al. | |
| 6,430,692 B1 * | 8/2002 | Kimble et al. | 713/300 |
| 6,476,311 B1 * | 11/2002 | Lee et al. | 136/244 |
| 6,583,522 B1 * | 6/2003 | McNulty et al. | 307/71 |
| 6,624,535 B2 * | 9/2003 | Morrow | 307/71 |
| 6,744,073 B1 | 6/2004 | Nakata | |
| 6,744,236 B2 * | 6/2004 | Capel et al. | 320/101 |
| 7,109,528 B2 | 9/2006 | Nakata | |
| 7,205,626 B1 | 4/2007 | Nakata | |
| 7,214,557 B2 | 5/2007 | Nakata | |
| 7,220,997 B2 | 5/2007 | Nakata | |
| 7,238,968 B2 | 7/2007 | Nakata | |
| 2001/0011881 A1 * | 8/2001 | Emori et al. | 320/116 |
| 2002/0096206 A1 | 7/2002 | Hamakawa et al. | |
| 2002/0109957 A1 | 8/2002 | Asai et al. | |
| 2004/0238833 A1 | 12/2004 | Nakata | |
| 2005/0067622 A1 | 3/2005 | Nakata | |
| 2005/0127379 A1 | 6/2005 | Nakata | |
| 2006/0043390 A1 | 3/2006 | Nakata | |
| 2006/0086384 A1 | 4/2006 | Nakata | |
| 2006/0133073 A1 | 6/2006 | Nakata et al. | |
| 2006/0169992 A1 | 8/2006 | Nakata | |
| 2007/0169804 A1 | 7/2007 | Nakata | |

FOREIGN PATENT DOCUMENTS

| | | |
|---|---|---|
| GB | 1195547 | 6/1970 |
| JP | 54-126931 | 10/1979 |
| JP | 61-158372 | 7/1986 |
| JP | 1-179374 | 7/1989 |
| JP | 5-36997 | 2/1993 |
| JP | 6-013633 | 1/1994 |
| JP | 7-322633 | 12/1995 |
| JP | 07-322633 | 12/1995 |
| JP | 8-199513 | 8/1996 |
| JP | 9-49213 | 2/1997 |
| JP | 9-162434 | 6/1997 |
| JP | 9-260698 | 10/1997 |
| JP | 9-322557 | 12/1997 |
| JP | 10-33969 | 2/1998 |
| JP | 2000-22184 | 1/2000 |
| JP | 2000-259992 | 9/2000 |
| JP | 2001-102618 | 4/2001 |
| JP | 2001-119093 | 4/2001 |
| JP | 2001-156315 | 6/2001 |
| JP | 2001-168369 | 6/2001 |
| JP | 2001-177132 | 6/2001 |
| JP | 2001-210834 | 8/2001 |
| JP | 2001-210848 | 8/2001 |
| JP | 2001-218365 | 8/2001 |
| JP | 2001-267609 | 9/2001 |
| JP | 3231244 | 9/2001 |
| JP | 2002-010520 | 1/2002 |
| JP | 2002-50780 | 2/2002 |
| JP | 2002-164554 | 6/2002 |
| JP | 2002-280592 | 9/2002 |
| JP | 3349181 | 9/2002 |
| WO | WO-98/15983 | 4/1998 |
| WO | WO-02/35613 | 5/2002 |
| WO | WO-03/017382 | 2/2003 |
| WO | WO-03/036731 | 5/2003 |
| WO | WO-03/056633 | 7/2003 |

OTHER PUBLICATIONS

Murayama et al., "Light trapping in spherical silicon solar cell module", Solar Energy Material & Solar Cells, vol. 79, (2003), pp. 113 to 124.

A. W. Bett et al., "III-V compound for solar cell applications", Applied Physics A, vol. 69 (1999), pp. 119 to 129.

N.S. Alvi et al., "The Potential for Increasing the Efficiency of Photovoltaic Systems Using Multiple Cell Concepts", Conference Record of the 12th IEEE Photovoltaic Specialists Conference, 1976, pp. 948 to 956.

* cited by examiner

| generating mode | number of modules connected in series | number of group of module | output voltage |
|---|---|---|---|
| M1 | 1 | 48 | 5~6 V |
| M2 | 2 | 24 | 10~12 V |
| M4 | 4 | 12 | 20~24 V |
| M8 | 8 | 6 | 40~48 V |
| M16 | 16 | 3 | 80~96 V |
| M24 | 24 | 2 | 120~144 V |
| M48 | 48 | 1 | 240~288 V |

| first power generating panel output voltage | second power generating panel output voltage | total output voltage |
|---|---|---|
| 5~6 V | 5~6 V | 10~12 V |
| 10~12 V | 5~6 V | 15~18 V |
| 20~24 V | 10~12 V | 30~36 V |
| 40~48 V | 20~24 V | 60~92 V |
| 80~96 V | 40~48 V | 120~144 V |
| 120~144 V | 80~96 V | 200~240 V |
| 240~288 V | 120~144 V | 360~432 V |
| 240~288 V | 240~288 V | 480~576 V |

[prior Art]

(A)

(B)

POWER GENERATION SYSTEM

TECHNICAL FIELD

The present invention relates to a power generating system generating AC power via an inverter circuit from DC power generated from solar batteries or fuel cells to improve a switching mechanism for switching the voltage of DC power in multi-steps, and electric storage and power generation performance.

BACKGROUND OF THE RELATED ART

Thanks to the recent gradual decrease in the production cost of solar batteries used in solar electric generating systems, many consumers utilize solar electric generating systems at home, although many of the home solar electric generating systems are cooperation type systems connected to a commercial single phase AC system supplied to residential areas. The solar battery of home solar power electric generating systems is connected in series-parallel to several dozen power generating modules with small kW output. The cooperation type solar electric generation systems require converting DC power into AC power via an inverter circuit to be used for single phase AC systems.

The publicly known solar electric generating system shown in FIG. 24 is a typical cooperation type system controlling an inverter circuit by the PWM method and having a solar battery 100 wherein a plurality of the sub-units of a plurality of power generating modules connected in series are connected in parallel, inverter circuit 101 and control device 102 controlling the inverter circuit 101 by switching. The control device 102 is provided with a voltage detection device 103 detecting the standard voltage of the AC system, amplifier 104 amplifying the detected voltage, triangular wave generator 105 and PWM control part 106. As shown in FIG. 24, the PWN control part 106 controls the switch elements of the inverter circuit 101 based on sine waves 107 of the command voltage according to the standard voltage shown in FIG. 25 and carriers 108 generated in the triangular generator 105, and then accomplishes output to the AC system after converting to sine wave AC power by the generating square wave AC voltage 109, as shown in FIG. 25, and flattening the square wave AC voltage 109 via a filter circuit.

However, regarding the technology controlling the inverter circuit using the above PWM method, there is a problem that approximately only 90% of the output of solar battery is utilized as the output of the solar battery, and needs to be intermittently shut off to convert to AC power. Furthermore, due to the generation of harmonic components from frequent switching of switching elements in the inverter circuit and the impedance of the AC system, a large filter means or electromagnetic interference removal means needs to be provided to absorb the harmonic components. In addition, there is another problem of having a large loss in power devices, such as an inverter circuit and switching elements due to the large number of switching frequencies involving significant voltage changes.

In contrast, there is another proposal for a solar electric generation system utilizing a battery switching system by changing the output voltage level in multi-steps via switching the number of solar batteries out of a plurality of solar batteries to provide the output. In this power generation system, as shown in FIG. 26, for instance, four sets of solar batteries 110 capable of generating 10V, 20V, 40V and 80V DC power are provided and only a switch S1 out of switches S1, S2, S3 and S4 is turned on to output 10V DC power and the voltage of DC power can be increased/decreased stepwise in increments of 10V to switch to 20V, 30V, . . . 140V and 150V by combining the switches to be turned on. DC power is output to the AC system after being converted to AC power as shown in FIGS. 27(A) and (B) via an inverter circuit 111. In this solar electric generation system utilizing a battery switching system, in comparison with the power generation system previously described in FIG. 24, problems associated with harmonic waves or electromagnetic field interference are mitigated. However, there is the problem that the rate of utilization becomes significantly lower since all of the four solar batteries are used only for a short time to generate a peak voltage and one or a plurality of solar batteries are in the idle stage most of the time.

When any of the four sets of solar batteries 110 is blocked by buildings and the like and only partial sunlight becomes available, the power to be generated from the blocked solar battery 110 is significantly decreased to reduce the output voltage influencing the normal output of AC power. Furthermore, there is another problem that the DC voltage is not generated from any of the four sets of the solar batteries 110 during the nights when sunlight is not available, therefore, the power generation time by the solar battery 110 is limited to affecting the performance of power generation by the power generation system.

In recent years, the development of a power generation system utilizing a fuel cell system is advanced and is expected to be gradually put to practical use in the near future as a home power generation system.

The fuel cell is comprised of layered multiple single cells and is configured to output DC power by connecting a number of single cells in parallel. Since each single cell generates approximately 0.6-0.7V DC power, and there is the same problem as the solar electric generating system in a way which utilizes technology to provide DC power generated from a power generating system to an AC system by having the power generating system cooperate with a home single phase AC system.

SUMMARY OF THE INVENTION

The present invention proposes a power generating system comprising a power generator generating DC power, and an inverter circuit for converting DC power generated by the power generator into AC power, wherein the power generator comprises a plurality of power generating modules each comprising a plurality of power generating units or power generation parts and at least one electric storage means connected in parallel to each of the plurality of power generating modules; and comprises positive/negative buses connected to an input side of the inverter circuit, a plurality of the first switch means for connecting/disconnecting each of positive electrodes of the plurality of power generating modules to/from the positive bus, a plurality of second switch means for connecting/disconnecting each of the positive electrodes of the plurality of power generating modules to/from a negative electrode of the power generating module contiguous to the one side, and a plurality of third switch means for connecting/disconnecting each of negative electrodes of the plurality of power generating modules to/from the negative bus.

Each of the plurality of power generating modules receives sunlight to constantly generate a specified voltage of DC power and simultaneously, the electric storage means connected in parallel to each of the plurality of power generating modules constantly receives a specified voltage of DC power provided from the power generating module for the electric storage of DC power.

When all first switch means are turned on, all of the second switch means are turned off, and all of the third switch means are turned on, and all of the power generating modules are connected in parallel to the positive/negative buses and the DC output voltage becomes the minimum voltage Vmin.

The plurality of the power generating modules are divided into a plurality of groups and the plurality of power generating modules in each group is connected in serial with the plurality of second switch means while connecting in parallel to the positive/negative buses with first and third switch means. When the number of power generating modules connected in series is changed to two, the DC output voltage becomes 2Vmin, the number of power generating modules is changed to four, and the DC output voltage becomes 4Vmin. Thus, the DC output voltage output from the power generator can be increased/decreased in multi-levels.

However, as described above, the DC output voltage can be changed stepwise by simply switching the first, second and third switch means while effectively utilizing the output of all of the power generating modules. Without idling the power generating modules, the utilization rate of the power generating modules is fully improved.

Although switching the plurality of the first, second and third switch means still needs to be performed, the voltage change due to switching of the switch means is small, and therefore, less noise and harmonic waves are generated in comparison with the conventional PWM method. This allows simplifying the electric circuit structure by decreasing the filter capacity for noise and harmonic wave absorption or electric magnetic field interference. In addition, the switching frequency of the plurality of first, second and third switch means becomes smaller in comparison with the switching element of the inverter circuit of the PWM system, and small switching elements can be used for the plurality of first, second and third switch means, which decrease the switching loss or the switching cost.

Now, when the power generating module is a solar battery power generating module, the connecting pattern of the first, second and third switch means can be changed to adjust the DC power voltage produced from the power generator according to the output voltage drop of the power generating module when it is cloudy, in the morning or evening, eliminating the use of a boosting chopper, which makes this power generating system versatile and flexible. Then, since electric property such that the output current decreases stepwise when the output voltage is increased in multi-levels, whereas the output current increases in multi-levels when the output voltage is decreased stepwise, is designed by switching the plurality of first, second and third switch means, it can be controlled to operate the system when the power generator is at a maximum power point.

Alternatively, even when the output voltage property of any of the plurality of solar battery power generating modules is not consistent or the amount of generated power is significantly decreased when buildings and the like partially block the solar battery power generating module, the electric storage means connected in parallel to the power generating modules having decreased power voltage outputs a specified voltage DC power to the positive/negative buses to compensate for the output voltage drop for the power generating modules, to level the output power to improve the DC voltage-DC current property of the power generating modules. Furthermore, even when the plurality of power generating modules are generating the DC power as it becomes at night and no sunlight is available, a specified voltage DC power is produced from the electric storage means in electric storage stage to the positive/negative buses, so that the power generation property is significantly improved without limiting the power generation time. These are the advantages of the power generating system of the present invention.

Now, it is possible to adopt the following various modifications.

(a) Each of the first, second and third switching means is individually comprised of a semiconductor switching element, having a control device to switch the output voltage of the power generator stepwise by switching these plurality of first, second and third switch means.

(b) A plurality of power generating modules are divided into a plurality of groups and the control device connects the power generating modules of each group in parallel with the positive/negative buses by first and third switch means while the plurality of the second switch means connecting the plurality of power generating modules of each group in series.

(c) An inverter circuit comprises a plurality of semiconductor switching elements, which are controlled by the control device.

(d) A voltage detection means detecting the voltage of an AC power system to which said power generation system supplies the power thereto, wherein the control device controls the first, second and third switch means and the plurality of semiconductor switching elements of the inverter circuit based on the detection signals of the voltage detection means.

(f) A plurality of power generation units of the power generating module are aligned in a matrix with a plurality of rows and columns and connected in a serial-parallel connection.

(g) Each of the power generation unit is composed of a solar cell made from granular semiconductor materials with a pn junction.

(h) A power generator is comprised of a fuel cell layered with a plurality of single cells and the power generation unit is comprised of the single cells.

(i) An electric storage means is comprised of an electric double layer capacitor.

(j) The electric storage means is comprised of a secondary battery.

DETAILED DESCRIPTION OF THE PREFERRED EMBODIMENTS

Figure 1:
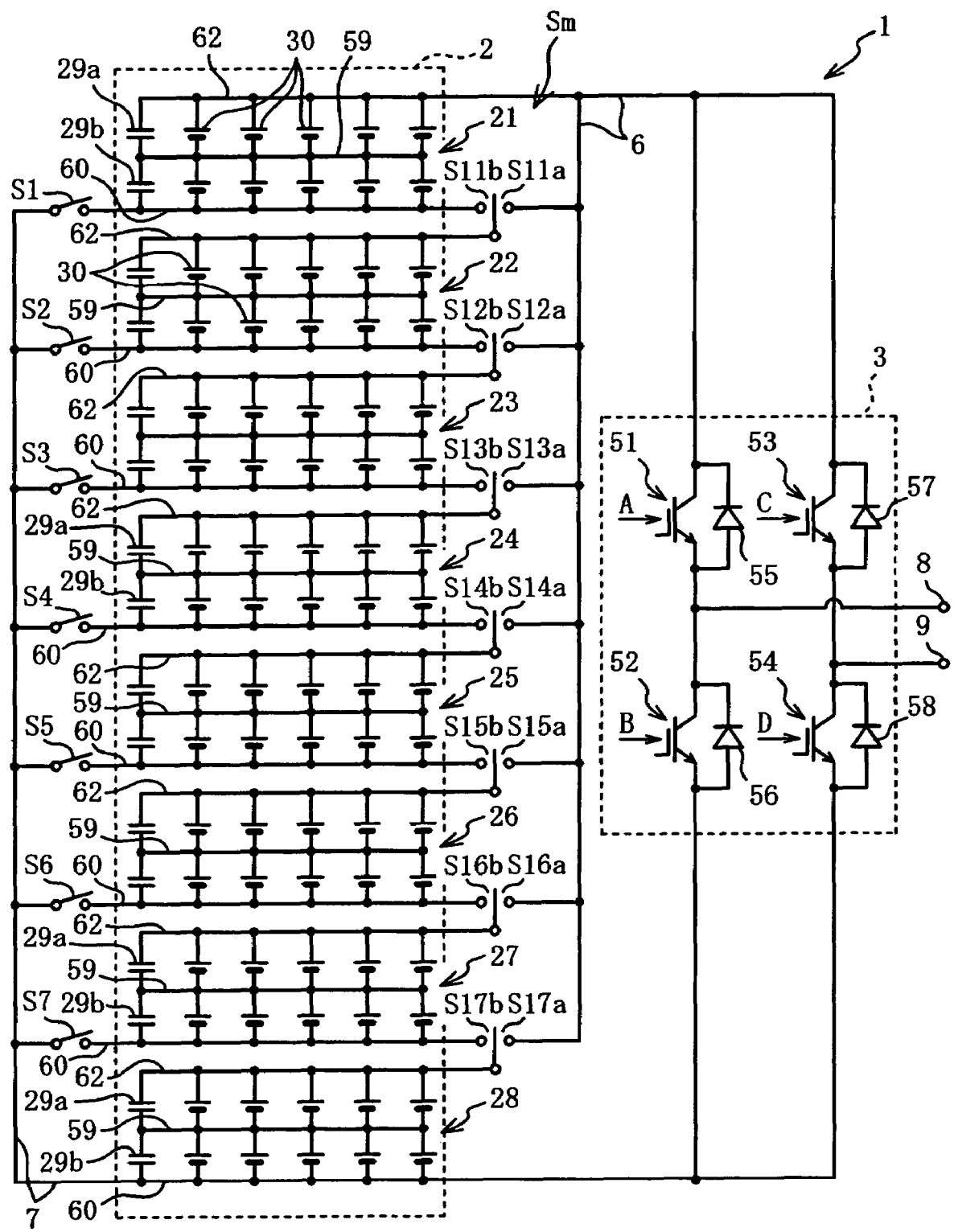
FIG. 1 is a circuit diagram of a power generation system.

A preferred embodiment to implement a power generating system of the present invention will be described hereinafter.

As shown in FIG. 1-FIG. 7, the power generating system 1 is comprising a power generator 2 electrically generating DC power, an inverter circuit 3 for converting DC power generated by the power generator 2 into AC power to output to a single phase AC system, a switching mechanism Sm to switch the DC power voltage of the power generator 2 in multi-levels, a control device 4 controlling the switch mechanism Sm and switching elements 51-54 of the inverter circuit 3, and a voltage detector 5 applying input to the control device 4 after detecting the single phase AC system voltage.

For the sake of simplicity of descriptions, the power generator 2 in accordance with the present embodiment is comprising 8 power generating modules 21-28, the electric double layer capacitors 29a for electric storage each of which is connected to positive electrode 62 and parallel connection wire 59 in the middle, and electric double layer capacitors 29b for electric storage each of which is connected to the parallel connection wire 59 and negative electrode 60 connected in parallel to each of the power generating modules 21-28. These power generating modules 21-28 are aligned with the same direction of the power generation and each of the power generating modules 21-28 is comprised of 10 power generation units 30 that are aligned in a 2×5 matrix (2 rows; 5 columns) connected in a series-parallel connection.

Figure 2:
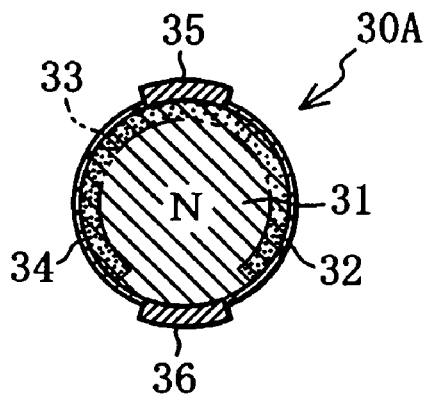
FIG. 2, FIG. 3 and FIG. 4 are cross-sectional views of power generating units.
Figure 3:
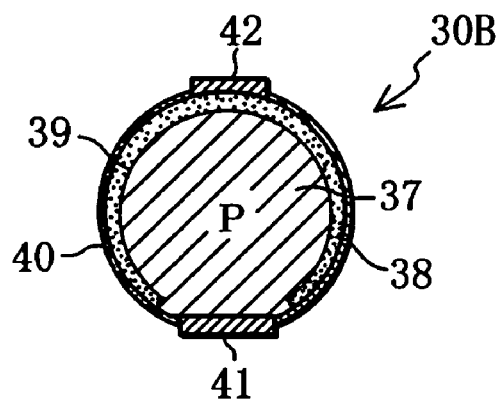
Figure 4:
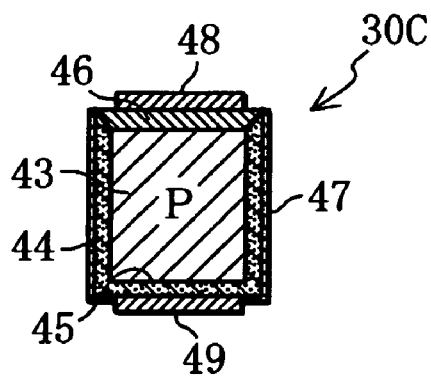

Each power generation unit 30 is, for instance, made of any solar cell out of three kinds of granular solar cells 30A-30C shown in FIG. 2-FIG. 4 and is capable of generating, for instance, 0.5-0.6V DC upon the receipt of sunlight.

The solar cell 30A in FIG. 2 is comprised of a n type spherical semiconductor 31 of approximately 1.5-3.0 mm in diameter made from an n type silicon, a p type diffusion layer 32, a pn junction 33, a silicon oxide insulator 34 and positive electrode 35 and negative electrode 36 opposing each other with the center of the spherical semiconductor 31 in the middle. In addition, this type of solar cell 30A is already disclosed in WO98/15983 by the present inventor. The solar cell 30B in FIG. 3 is comprised of a spherical semiconductor 37 of the same size as the above, n type diffusion layer 38, pn junction 39, silicon oxide insular 40 and positive electrode 41 and negative electrode 42 opposing each other with the center of the spherical semiconductor 37 in the middle, and the positive electrode 41 being equipped on the flat surface formed on the bottom of the spherical semiconductor 37 to distinguish the positive electrode 41 from the negative electrode 42. The solar cell 30C shown in FIG. 4 is comprised of a cylindrical semiconductor 43 of approximately 1.5-3.0 mm in diameter made from the p type silicon, n type diffusion layer 44, pn junction 45, p+ type diffusion layer 46, silicon oxide insulator 47 and positive electrode 48 and negative electrode 49 placed on both edges.

However, above solar cells 30A-30C are illustrative only and various power generating modules with the function of generating approximately 1.0-10.0 V DC power (for instance, a single panel solar battery, panel solar battery by combining a plurality of small panel solar batteries and fuel cells) are applicable as a power generating module. In addition, various power generation units or power generation parts generating relatively low voltage DC power (for instance, one or a plurality of power generation parts or power generation functional parts contained in a single panel solar battery or panel solar battery by combining a plurality of small panel solar batteries and fuel cell) is applicable as a power generation unit 30.

The electric double layer capacitors 29a and 29b for electric storage are less pollutant, have an excellent charge-discharge behavior and are capable of a relatively large electric storage capacity as they utilize activated charcoal which makes contact with an electrolyte as electrodes and storage in a similar manner to capacitors when the electrolytes and activated charcoal are in contact to polarize the interface as the voltage. In each power generating module, the electric double layer capacitor 29a is connected to the positive electrode 62 and the parallel connection wire 59, as well as connected in parallel to the upper five power generation unites 30 connected in parallel. In addition, the electric double layer capacitor 29b is connected to the parallel connection wire 59 and the negative electrode 60, as well as being connected in parallel to the lower five power generation units 30 connected in parallel.

Therefore, the electric double layer capacitors 29a and 29b receive DC power generated by a plurality of power generation units 30 connected in parallel and store constant storage DC power. However, when the amount of power generation of one or a plurality of power generation units 30 is significantly lowered, the electric double layer capacitors 29a and 29b produce a specified voltage DC power to the positive/negative buses 6 and 7 to compensate for the lowered output power.

The inverter circuit 3 is for instance, a circuit connecting four switching elements 51-54 of n channel type IGBT in a bridge shape, and reflux diodes 55-58 are connected to each switching element 51-54. These four switching elements 51-54 are controlled by control signals from the control device 4.

By alternatively conducting paired switching elements 51 and 54 and paired switching elements 53 and 52, AC is output from the terminals 8 and 9 to the single phase AC system.

The switching mechanism Sm will be described next.

Figure 5:
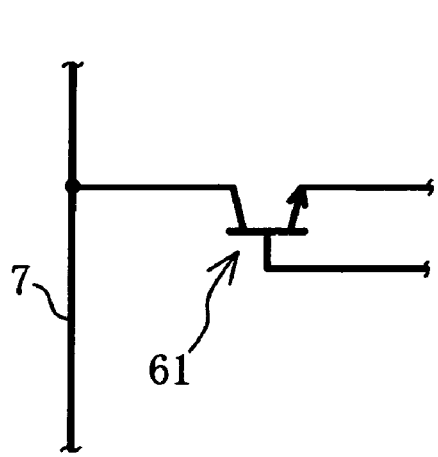
FIG. 5 is a transistor circuit diagram showing the configuration of switches S1-S7.

The positive bus 6 and the negative bus 7 are connected to the entry side of the inverter circuit 3. The switching mechanism Sm is placed between the power generator 2 and the inverter circuit 3 and connects an arbitrary number of the eight power generating modules 21-28 in parallel to allow each of such power generating module group connected in series to connect in parallel to the inverter circuit 3 in order to switch stepwise the output voltage of DC power generated by the power generator 2 to be output to the inverter circuit 3. The switching mechanism Sm is comprised of a plurality of switches S1-S7, S11a-S17a and S11b-S17b. The switches S1-S7 are the switches connecting/disconnecting each of the negative electrodes 60 of the seven power generating modules 21-27 to/from the negative bus 7. Each of the switches S1-S7 is comprised of, for instance, as shown in FIG. 5, an npn type bipolar transistor 61 that is turned on or off by the control device 4.

Figure 6:
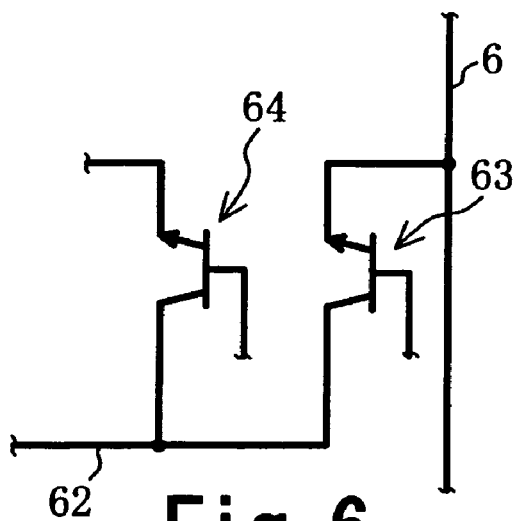
FIG. 6 is a transistor circuit diagram showing the configuration of switches S11a-S17a and S11b-S17b.

The switches S11a-S17a are the switches connecting/disconnecting each of the positive electrodes 62 of the seven power generating modules 22-28 to/from the positive bus 6. The switches S11b-S17b are the switches connecting/disconnecting the positive electrodes 62 of the seven power generating modules 22-28 to/from the negative electrodes 60 of the power generating modules 21-27 contiguous to the side of the positive electrode 62. Each of the switches S11a-S17a is comprised of, for instance, as shown in FIG. 6, an npn type bipolar transistor 63 turned on or off by the control device 4, and the switches S11b-S17b is composed of, for instance, as shown in FIG. 6, an npn type bipolar transistor 64 that is turned on or off by the control device 4.

However, when the transistor 63 is turned on, the transistor 64 is turned off, whereas when the transistor 64 is turned on, the transistor 63 is turned off. In this way, the positive electrode 62 is connected/disconnected to the positive bus 6 by the bipolar transistor 63 and the positive electrode 62 of the power generating modules is connected/disconnected to the negative bus 7, contiguous to the side of the positive electrode 62 by the bipolar transistor 64.

In addition, the plurality of transistors 63 as switches S11a-S17a correspond to the plurality of first switch means, the plurality of transistors 64 as switches S11b-17b correspond to the plurality of second switch means and the plurality of transistors 61 as switches S1-S7 correspond to the plurality of third switch means. Furthermore, the npn type bipolar transistors 61, 63 and 64 are illustrative only, and any switching elements capable of controlling turning on or off in a similar manner can be applied. The switching elements 51-54 of the inverter circuit 3 are illustrative only, and other switching elements such as MOSFET can be applied.

Next, the control device 4 will be described.

Figure 7:
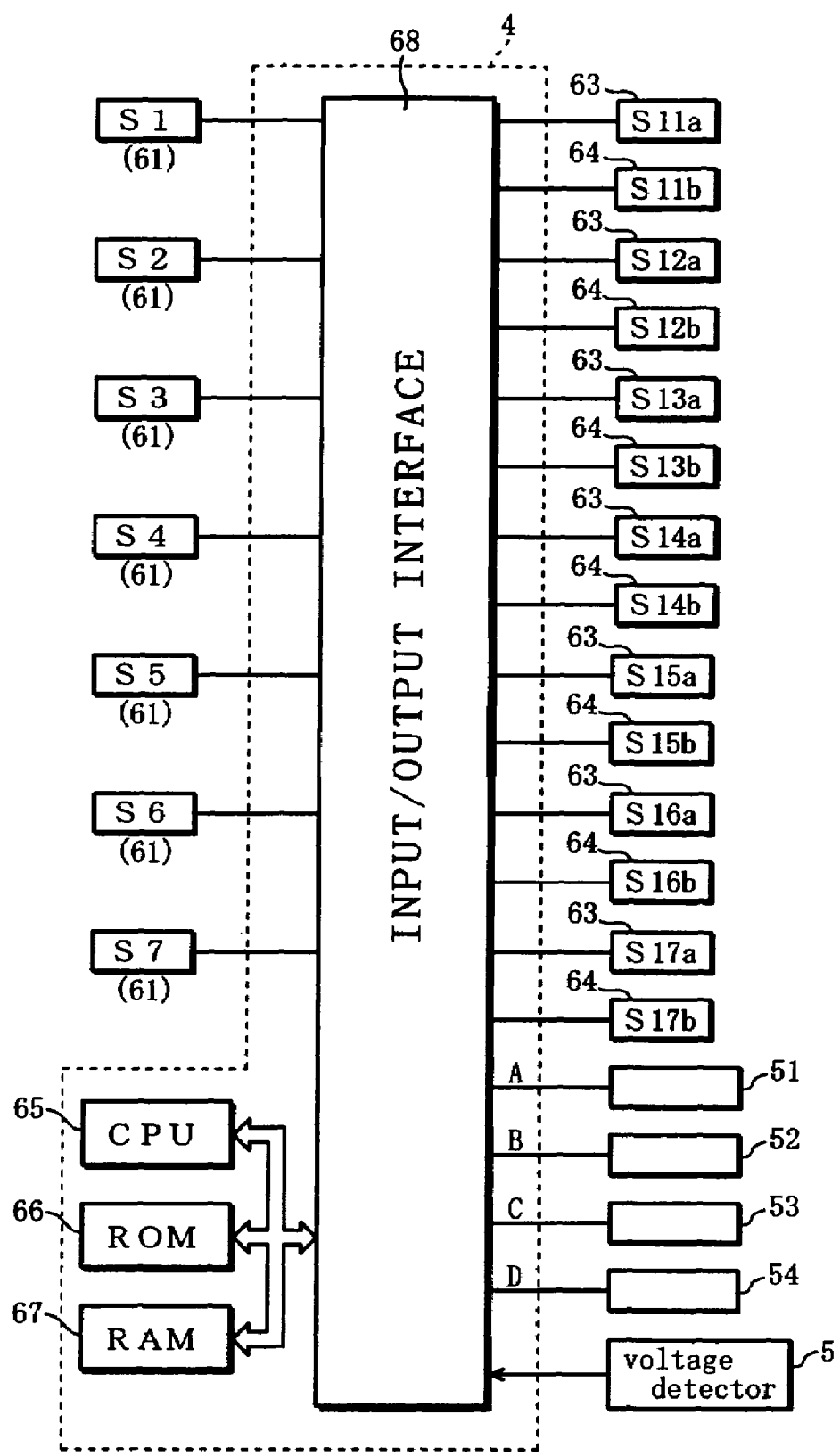
FIG. 7 is a block diagram of a control device of the power generating system.

As shown in FIG. 7, the control device 4 is mainly comprised of a computer including CPU 65, ROM 66 and RAM 67 and an input/output interface 68, and the switches S1-S7, switches S11a-S17a and switches S11b-S17b are individually connected to the input/output interface 68. The voltage detector 5 detecting the AC voltage of said single phase AC system is provided and the signals from the voltage detector 5 are entered to the control device 4. The ROM 66 of the control device 4 pre-installs the control program for switching the switches S1-S7, switches S11a-S17a, switches S11b-S17b and the switching element 51-54 based on the detection signals from the voltage detector 5 to be described later.

The control device 4 controls by turning on/off the switches S1-S7, switches S11a-S17a and switches S11b-S17b based on the control program of ROM 66 to switch the output voltage of the DC power of the power generator 2 in multi-levels.

Figure 8:
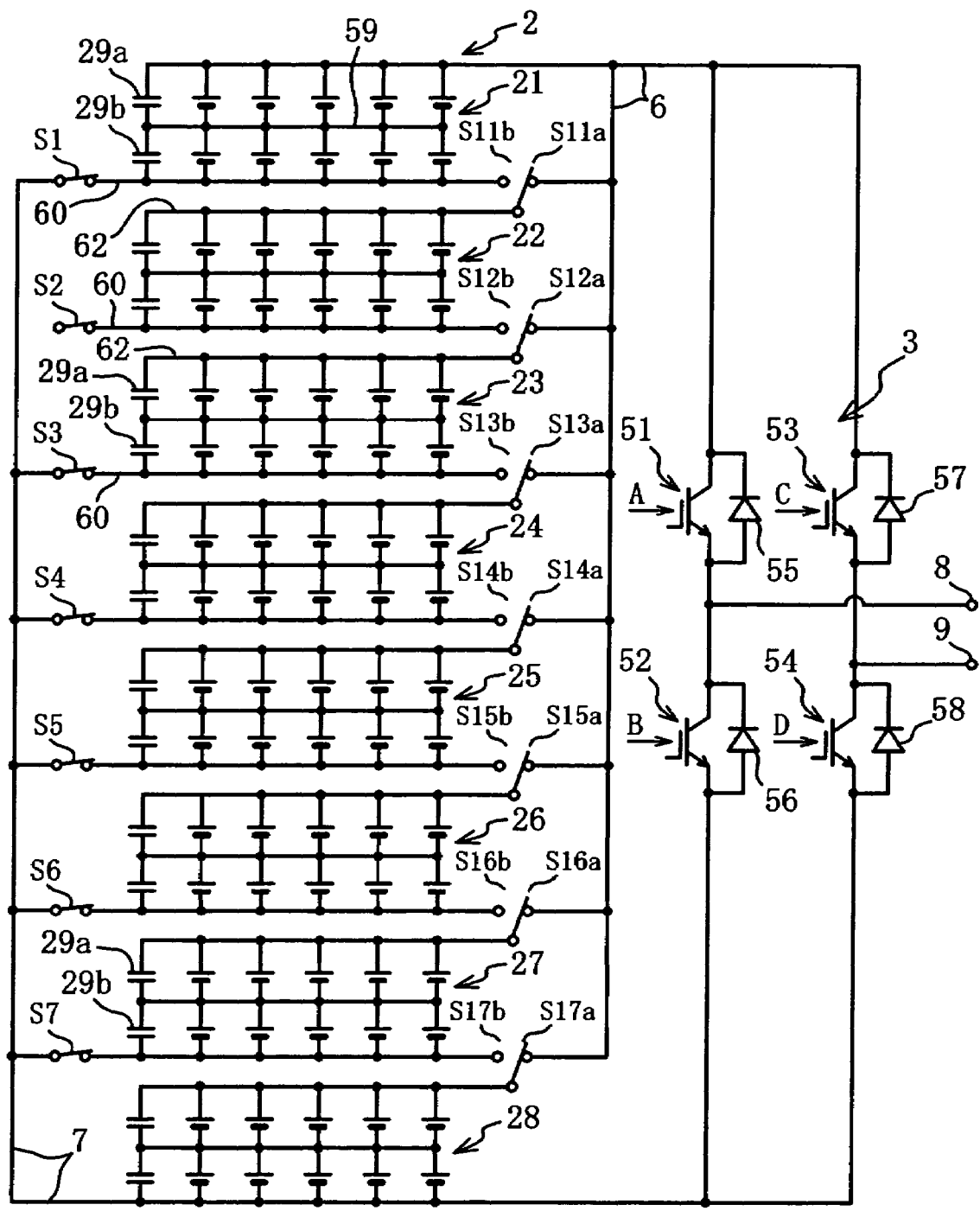
FIG. 8 is a circuit diagram of the power generation system in mode M1.

As the power generation voltage of each power generating modules 21-28 according to the present embodiment is approximately 1.0-1.2 V, as shown in FIG. 8, the power generator 2 which generates power by receiving the sunlight outputs approximately 1.0-1.2V DC power when all of the power generating modules 21-28 are connected to the positive/negative buses 6 and 7 in parallel when the switches S1-S7, S11a-S17a are switched (This state is called a power generation mode M1).

Figure 9:
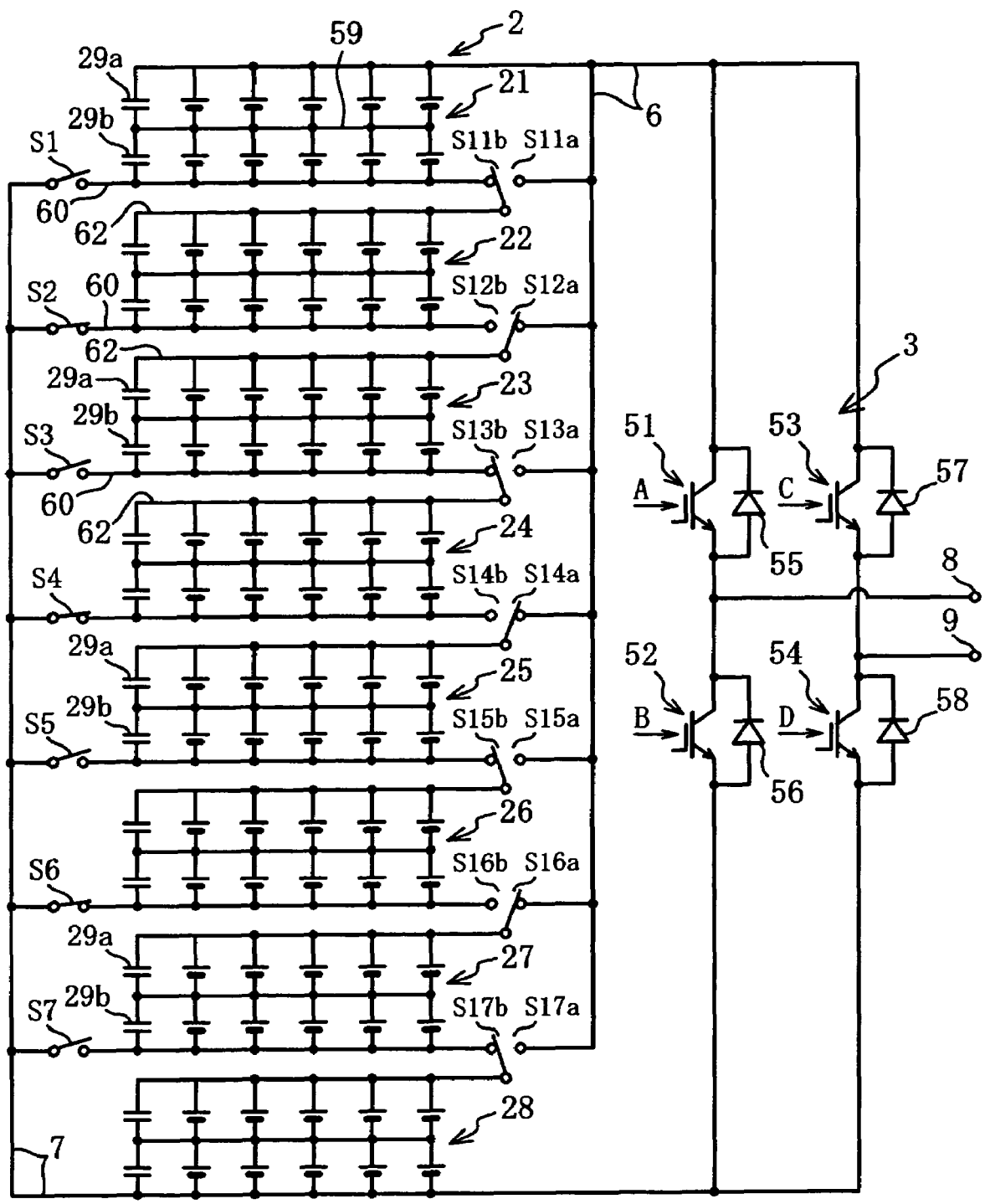
FIG. 9 is a circuit diagram of the power generation system in mode M2.

As shown in FIG. 9, when the switches S1-S7, S11a-S17a, S11b-S17b are switched, the eight power generating modules 21-28 are divided into four groups each of which includes two modules, and each of two power generating modules are connected in series (This state is called the power generation mode M2), the power generator 2 outputs approximately 2.0-2.4V DV power while the four power generating module groups are connected in parallel to the positive/negative buses 6 and 7.

Figure 10:
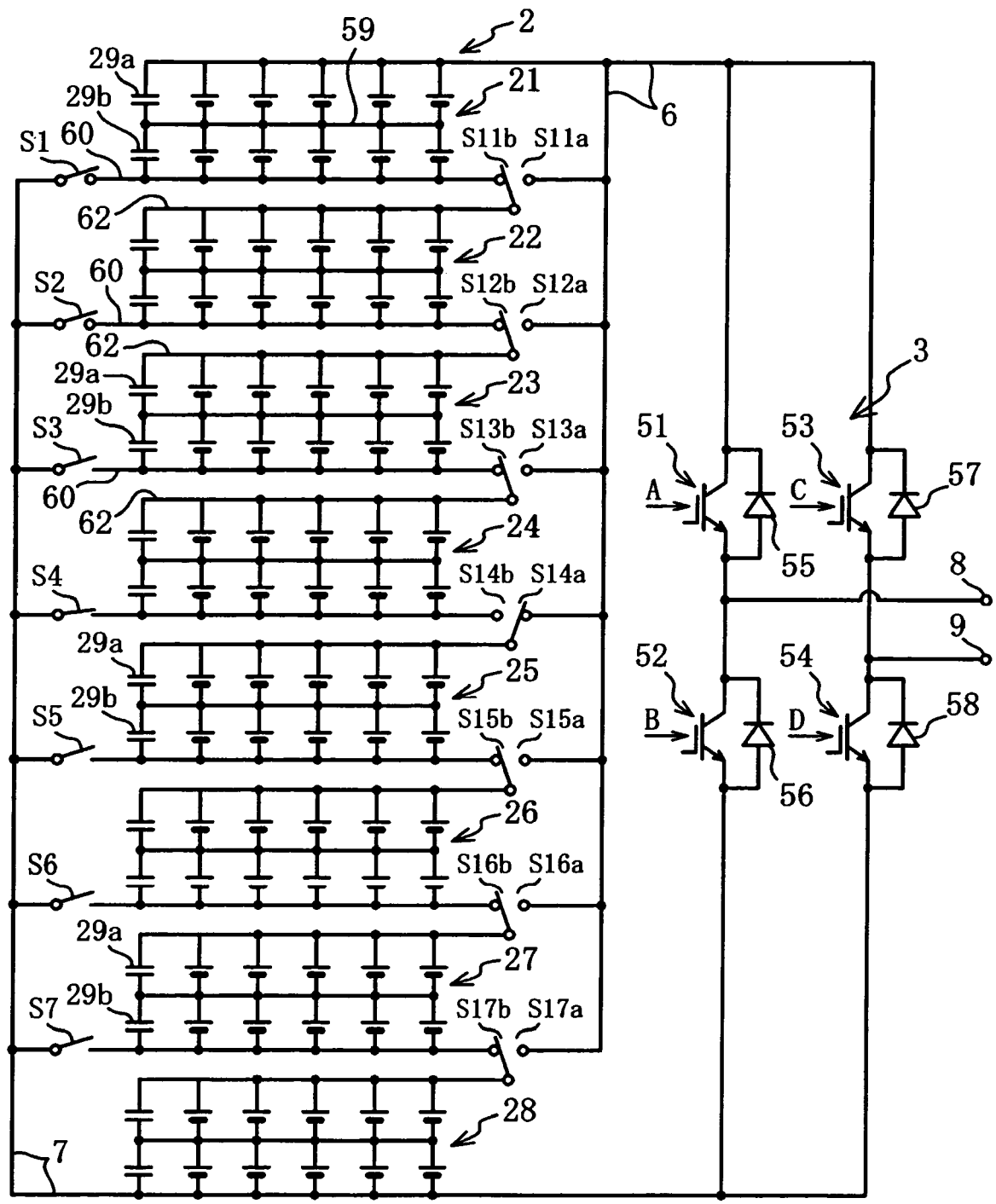
FIG. 10 is a circuit diagram of the power generation system in mode M4.

As shown in FIG. 10, when the switches S1-S7, S11a-S17b, S11a-S17b are switched, the eight power generating modules 21-28 are divided into two groups each of which includes four modules, and each of four power generating modules are connected in series (This state is called a power generation mode M4), the power generator 2 outputs approximately 4.0-4.8V DV power while the two power generating module groups are connected in parallel to the positive/negative buses 6 and 7.

Figure 11:
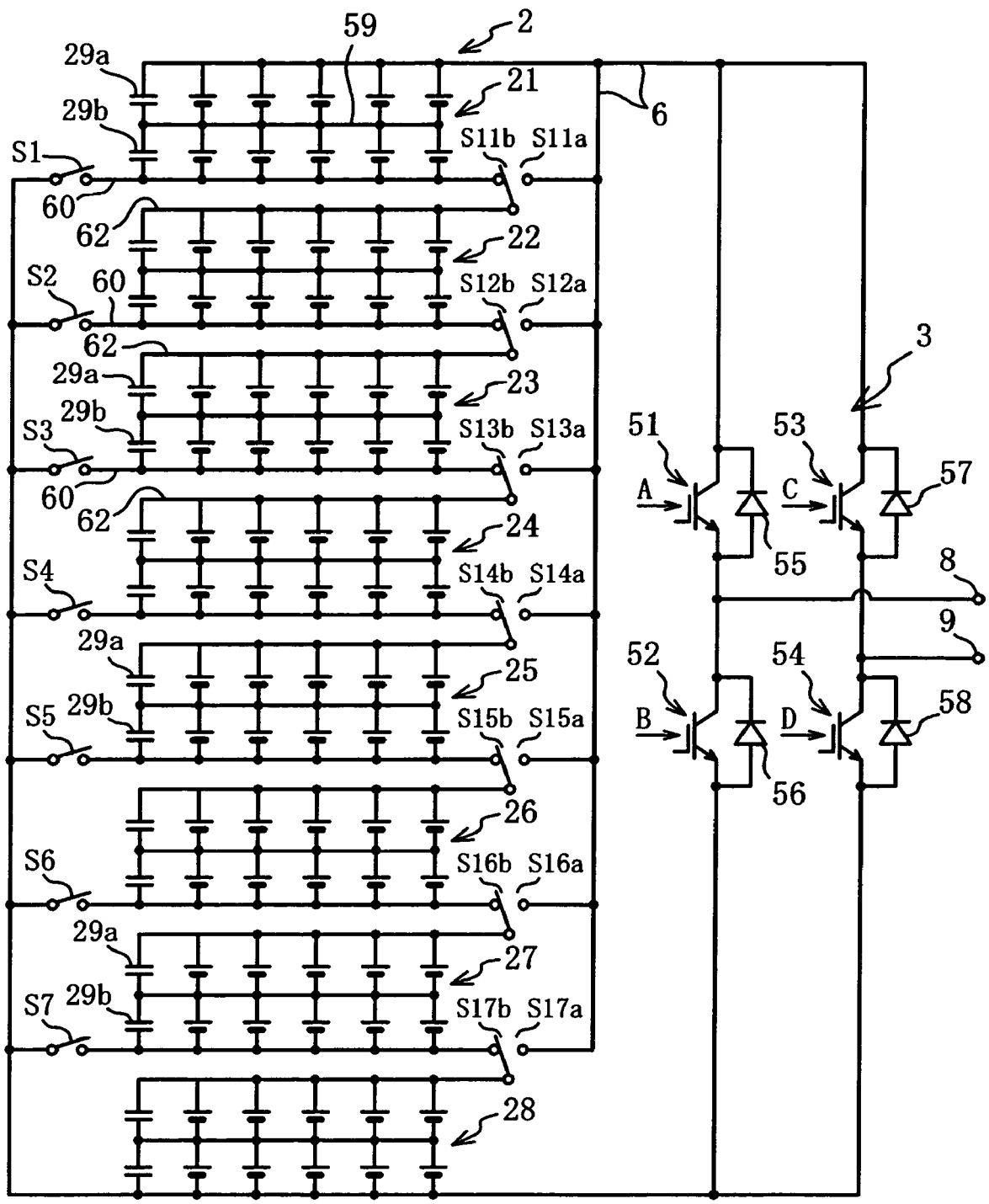
FIG. 11 is a circuit diagram of the power generation system in mode M8.

As shown in FIG. 11, when the switches S1-S7, S11a-S17a, S11b-S17b are switched, the eight power generating modules 21-28 are connected in series (This state is called a power generation mode M8), the power generator 2 outputs approximately 8.0-9.6V DV power. However, in any state of the power generation mode M1, M2, M4 or M8 described above, each of the electric double layer capacitors 29a and 29b constantly store the voltage of DC power for the same amount of the power generation voltage of the power generation units 30 connected in parallel (approximately 0.5-0.6V). Especially, when the power consumption by the single phase AC system is low, unused DC power generated by the power generation units 30 are promptly stored in the electric double layer capacitors 29a and 29b to be in full charge state.

Figure 12:
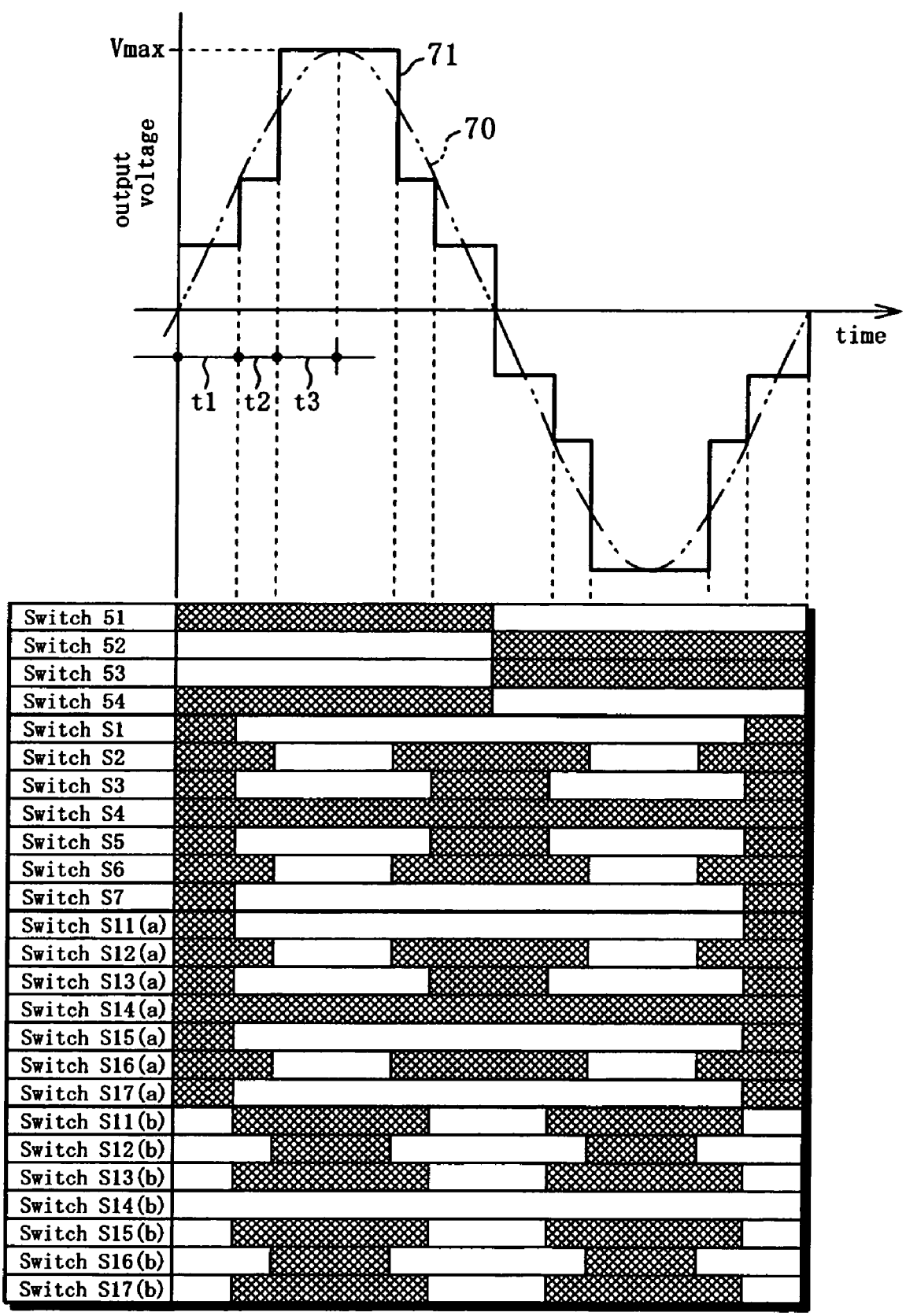
FIG. 12 is a diagram of the voltage waveform of the DC power produced from the power generating system in FIG. 1 and the voltage waveform of a single phase AC system at a high incident light level.

Now, when the high incident light suggests that the incident light by sunlight is abundant such as during sunny days, as shown in FIG. 12, the control device 4 switches switching elements 51-54, switches S1-S7, S11a-S17a, S11b-S17b appropriately for the AC waveforms 70 of the AC voltage of the single phase AC system detected by the voltage detector 5 (hatched lines indicate "ON" state, whereas space indicates the "OFF" state), and the AC power of the voltage waveforms 71, changing in step as shown with solid line, is output from the output terminals 8 and 9 of the inverter circuit 3 to the single phase AC system by switching to the power generation mode M1 in the first time interval t1, then to the power generation mode M2 in the next time interval t2 and to the power generation mode M4 in the next time interval t3 in steps.

Figure 13:
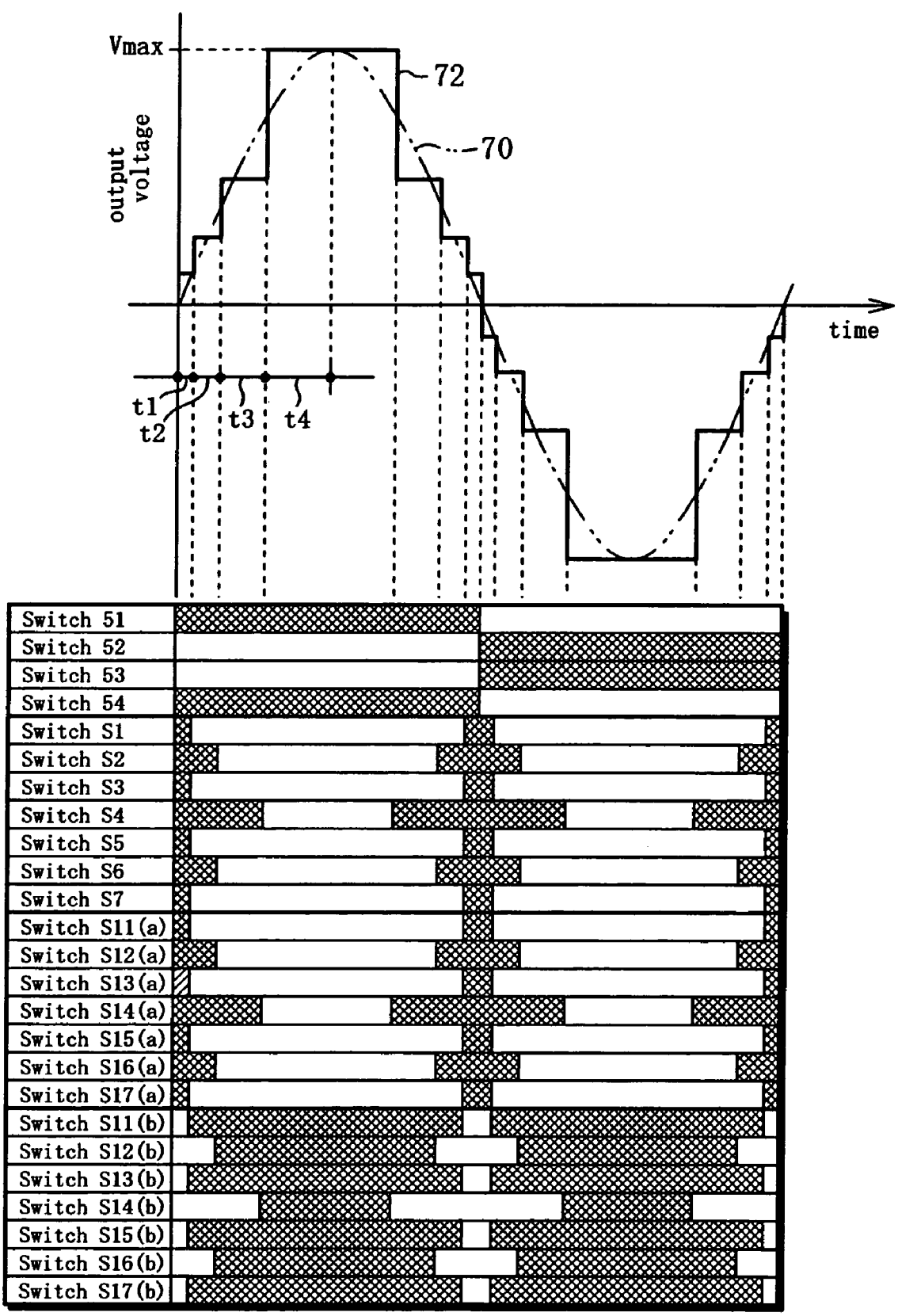
FIG. 13 is a diagram of the voltage waveform of the DC power produced from the power generating system in FIG. 1 and the voltage waveform of a single phase AC system at low incident light lebel.
Figure 14:
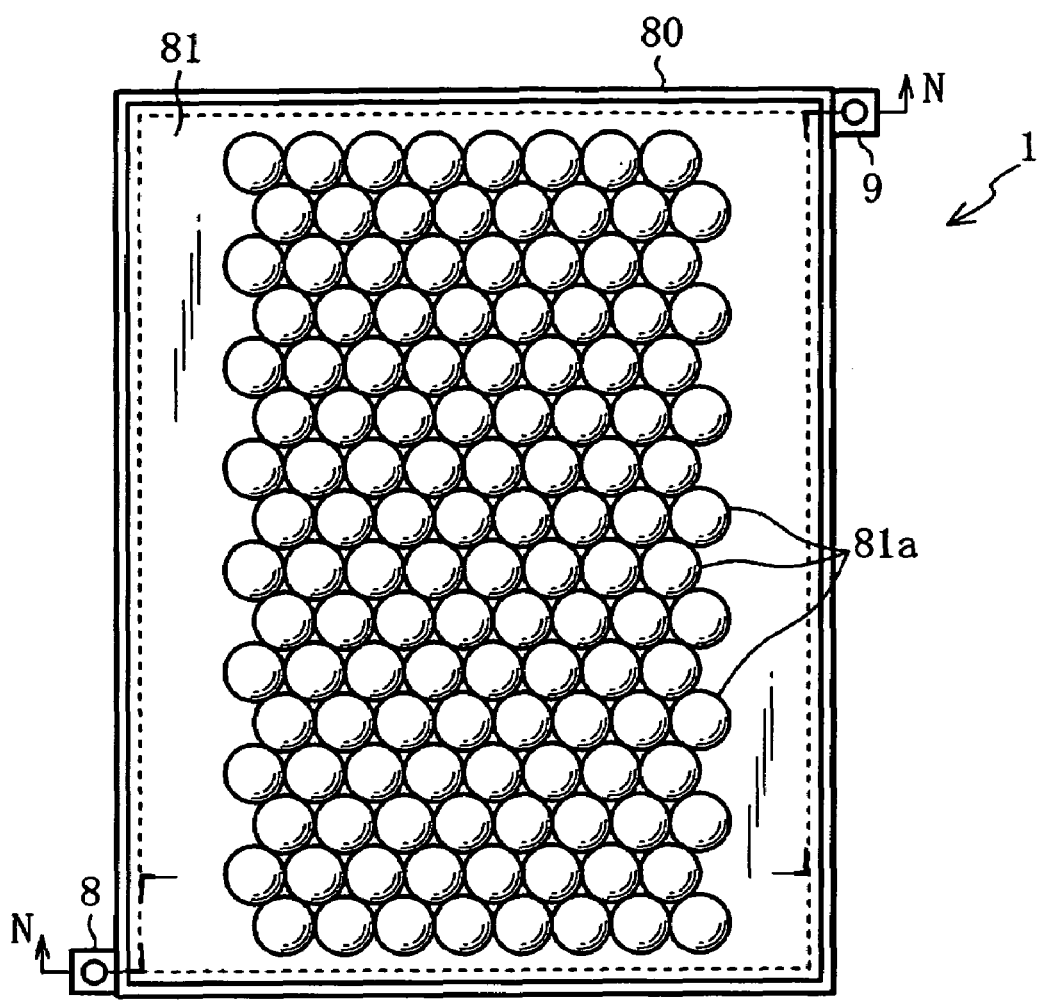
FIG. 14 is a plan view of a packaged power generation system.

In contrast, when the low incident light suggests that the incident light by sunlight is less available such as during cloudy days, mornings or evenings, as shown in FIG. 13, the control device 4 switches the switching elements 51-54, switches S1-S7, S11a-S17a, S11b-S17b appropriately for the AC waveforms 70 of the AC voltage of the single phase AC system detected by the voltage detector 5 (hatched lines indicate "ON" state, whereas space indicates "OFF" state), and the AC power of the voltage waveforms 72, changing in steps as shown with solid line, is effectively output from the output terminals 8 and 9 of the inverter circuit 3 to the single phase AC system even if the incident light is less available by switching to the power generation mode M1 in the first time interval t1, then to the power generation mode M2 in the next time interval t2, to the power generation mode M4 in the next time interval t3, and to the power generation mode M8 in the next time interval t4 in steps.

At this time, the time intervals, t1, t2, t3 and t4 as shown in figures are pre-programmed onto the computer to match the frequency of the single phase AC system to distinguish the high incident light and the low incident light and the output voltage is switched in steps by switching the switches S1-S7, S11a-S17a, S11b-S17b according to the level of incident light based on the detection voltage of the voltage detector 5.

Then, when the voltage of the single phase AC system changes from negative to positive, the switching elements 51 and 54 are conducted and the switching elements 53 and 52 are turned off, whereas when the voltage of the single phase AC system changes from positive to negative, the switching elements 52 and 53 are made conductive and the switching elements 51 and 54 are turned off.

Now, for instance, when the output voltage property of all or a part of the upper five power generation units 30 connected in parallel out of the plurality of power generation units 30 of the power generating modules 21 is/are not consistent or the total amount of the generated power from these five power generation units 30 significantly decreases when buildings and the like partially block the power generation units 30 to lower the output voltage than the electric storage voltage stored in the electric double layer capacitor 29a, the electric double layer capacitor 29a outputs a specified voltage DC power to the positive/negative buses to compensate for the output voltage drop, to level the output power to improve the DC voltage-DC current property of the power generating modules 21. This was described for the case of the power generating modules 21. However, the other power generating modules 22-28 operate in a similar prompt manner as do the electric double layer capacitors 29a and 29b are equipped similarly.

Furthermore, when DC voltage is not generated from any of the plurality of power generating modules 21-28 during nights when sunlight is not available, a specified voltage DC power stored in the electric double layer capacitors 29a and 29b is output to the positive/negative buses 6 and 7, so that the power generation property by the power generator 2 is significantly improved without limiting the power generation time. In addition, the capacity of the electric double layer capacitors 29a and 29b will be adjusted appropriately as needed.

As described above, the power generating system 1 is capable to increase or decrease the DC output voltage stepwise produced from the power generating system 1 by switching switches S1-S7, S11a-S17a and S11b-S17b of the switching mechanism Sm in various combinations to correspond to the power generation mode.

Furthermore, the DC output voltage can be changed in multi-levels by simply switching the switches S1-S7, S11a-S17a and S11b-S17b while effectively utilizing the outputs of all of the power generating modules 21-28. In this way, without idling the power generating modules 21-28, the utilization rate of the power generating modules 21-28 is fully improved.

Although switching the plurality of switches S1-S7, S11a-S17a and S11b-S17b still needs to be performed, the voltage change before and after switching is small, and therefore, less noise and harmonic waves are generated. This allows simplifying the internally attached electric circuit structure by decreasing the filter capacity for noise and harmonic waves absorption or electric magnetic field interference. In addition, the switching frequency of the switches S1-S7, S11a-S17a and S11b-S17b become smaller in comparison with the switching element of the inverter circuit of the PWM system, and small switching elements can be used for switches S1-S7, S11a-S17a and S11b-S17b, which decrease the switching loss or the switching cost.

Now, the connecting pattern of the switches S1-S7, S11a-S17a and S11b-S17b can be changed to adjust the DC power voltage produced from the power generator according to the output voltage drop of the power generating modules 21-28 when it is cloudy, in the morning or evening, eliminating the use of a boosting chopper, which makes this power generating system versatile and flexible. Then, since an electric property such that the output current decreases in steps when the output voltage is increased in steps, whereas the output current increases in steps when the output voltage is decreased in steps, is designed by switching the switches S1-S7, S11a-S17a and S11b-S17b, it can be controlled to operate the system when the power generator 2 is at a maximum power point.

Since the electric double layer capacitor 29a and the electric double layer capacitor 29b are aligned to connect each of the power generating modules 21-28 in parallel and when the output voltage property of some of the power generation units 30 are not consistent or the output voltage from the power generation units 30 becomes lower than the electric storage voltage electrically stored in the electric double layer capacitors 29a and 29b when buildings and the like partially block some of the power generation units 30, the electric double layer capacitors 29a and 29b output a specified voltage DC power to the positive/negative buses 6 and 7 to compensate for the output voltage drop, to level the output power from the power generating module 21-28 to improve the DC voltage-DC current property of the power generating modules 21-28. At this time, since each of the electric double layer capacitors 29a and 29b are connected in parallel to the plurality of power generation units 30, abnormal overvoltage does not affect each of the power generation units 30. Therefore, compact and low cost manufacturing of the power generating system 1 is achieved as it is not necessary to install diodes to prevent back-flow in associated with each of the power generation units 30.

Especially, when the electric power is required in the single phase AC system when any of the power generating modules 21-28 is not generating power such as at nights, DC power stored in the plurality of electric double layer capacitors 29a and 29b is output to the positive/negative buses 6 and 7, which becomes the use conditions of power loss limited to significantly improve the power generation property by the power generator 2.

The power generating system 1 has excellent versatility and flexibility since the power frequency produced from the inverter circuit 3 can be modified at will by controlling the control device 4. The above explanation is described hereafter using the example of when the AC power is output by controlling the voltage, and it can be designed to output the AC power by controlling the current through the switching operations of the switches S1-S7, S11a-S17a and S11b-S17b.

Specific example of practical application of the power generation system packaged in a compact design as described above will be explained in references to FIG. 14-FIG. 17.

The power generating system 1 is composed of a box-shaped main body case 80 made from synthetic resin with excellent durability, a lid member 81 made from synthetic resin covering the upper part of the main body case 80, a solar battery substrate 82 stored in the main body case 80, an electronic component substrate 83, a plurality of electric double layer capacitors 29a and 29b and an inverter circuit 3.

Figure 15:
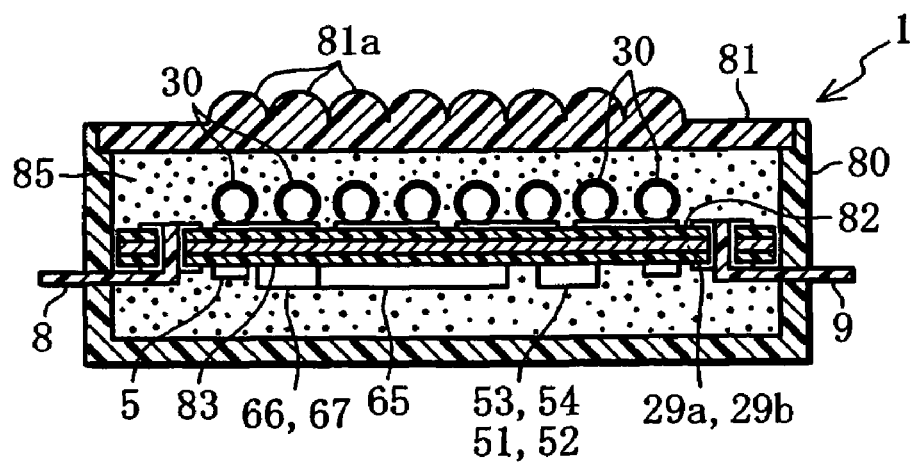
FIG. 15 is a cross-sectional view along N-N line of FIG. 14.
Figure 16:
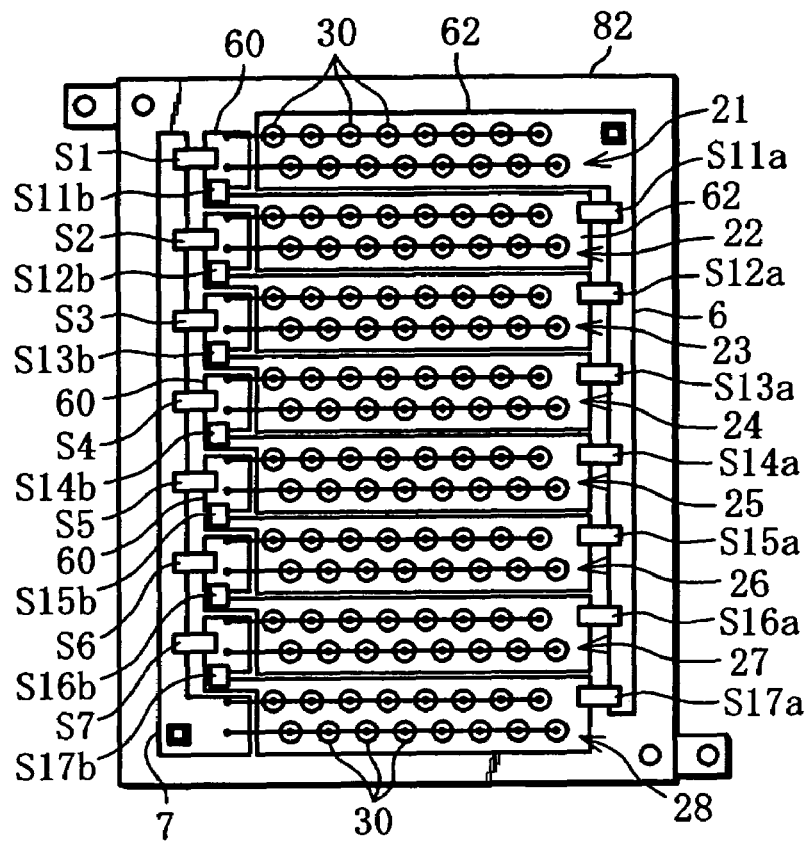
FIG. 16 is a plan view of a solar battery substrate placed on the upper side.

As shown FIGS. 15-16, the solar battery substrate 82 is stored upward in the main body case 80, and the etchings of positive electrode 62, positive bus 6, negative electrode 60 and negative bus 7 are individually formed on the solar battery substrate 82. In addition, the plurality of switches S1-S7 are provided between the negative bus 7 and the negative electrode 60 of the plurality of power generation modules 21-28, the plurality of switches S11a-17a are provided between the positive bus 6 and the positive electrode 62 of the plurality of power generating modules 21-28, and the plurality of switches S11b-17b are provided between the positive electrode 62 and the negative electrode 60. The plurality of power generation units 30 are aligned in a matrix on each of the positive electrodes 62 as shown in FIG. 1 and wired as shown in the figure.

Figure 17:
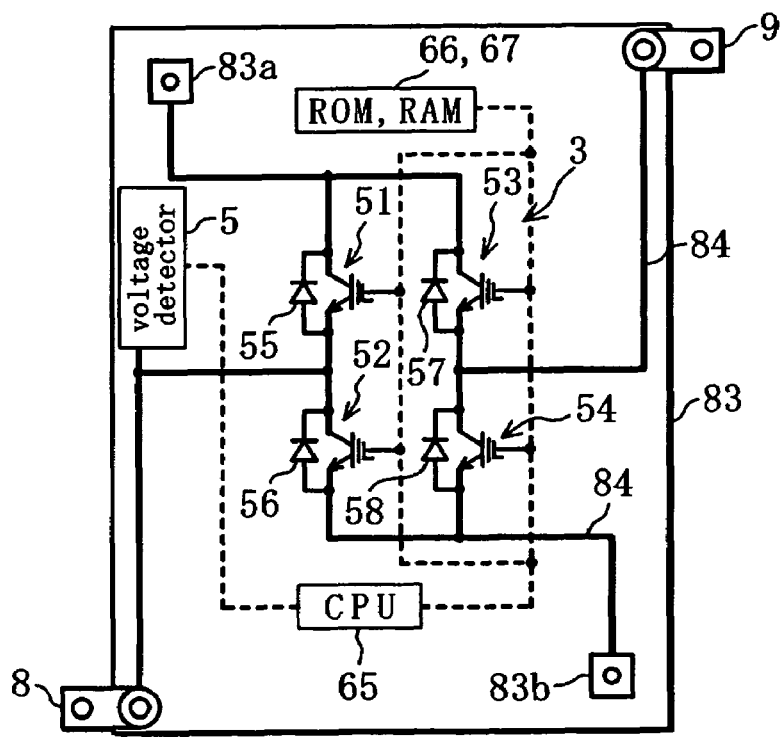
FIG. 17 is a rear view of an electric component substrate placed on the lower side.

The electric component substrate 83 stored downward in the main body case 80 is, as shown in FIG. 15 and FIG. 17, connected to the voltage detector 5, CPU 65, ROM and RAM 66 and 67 via the etched connection wire 84 and connected to the switching elements 51-54 of the inverter circuit 3 and the reflux diodes 55-58 as shown in the figure. The AC output terminals 8 and 9 are equipped on the opposing corners and a part of the AC output terminals 8 and 9 are stretched outside via the main body case. In addition, a numerical reference 83a indicates a connection part of the solar battery substrate 82 with the positive bus 6, whereas a numerical reference 83b indicates a connection part of the solar battery substrate 82 with the negative bus 7. The control line of the control device 4 is shown in dotted line.

The plurality of electric double layer capacitors 29a and 29b are placed between the upper part of the solar battery substrate 82 and the lower part of the electric component substrate 83 and each of the electric double layer capacitors 29a and 29b are, as shown in FIG. 1, electrically connected to the power generating modules 21-28.

While the solar battery substrate 82 and the electric component substrate 83 wherein the plurality of electric double layer capacitors 29a and 29b are placed between are horizontally placed in the middle in the height inside the main body case 80 and transparent silicone 85 is filled within, the upper part is firmly sealed with the lid member 81. On the upper surface of the lid member 81, hemispherical lens parts 81a are individually formed to correspond with each of the plurality of power generation units 30.

The power generating system 1 packed in this way is installed on the site where incoming sunlight is available, the sunlight effectively illuminates the power generation units 30 via the hemispheric lens parts 81a to output sufficient AC from the AC output terminals 8 and 9. Alternatively, the packaged plurality of power generating systems may be placed in a matrix to connect with the AC output terminals 8 and 9 as needed.

According to the embodiment as described above, the power generator 1 having eight power generating modules 21-28 were used as an example to facilitate understanding the present invention. However, for the home power generating system to be connected to a commercial single phase AC system, it needs to design to interconnect to AC system of 100Vrms (RMS voltage) and approximately 140Vp (peak voltage). Furthermore, it is desirable to design it so that the maximum output voltage of the power generation system is higher than 200 v considering the output drop of the power generating system in cloudy days, the mornings or evenings. An example of such power generation system is described using FIG. 18-FIG. 23.

Figure 18:
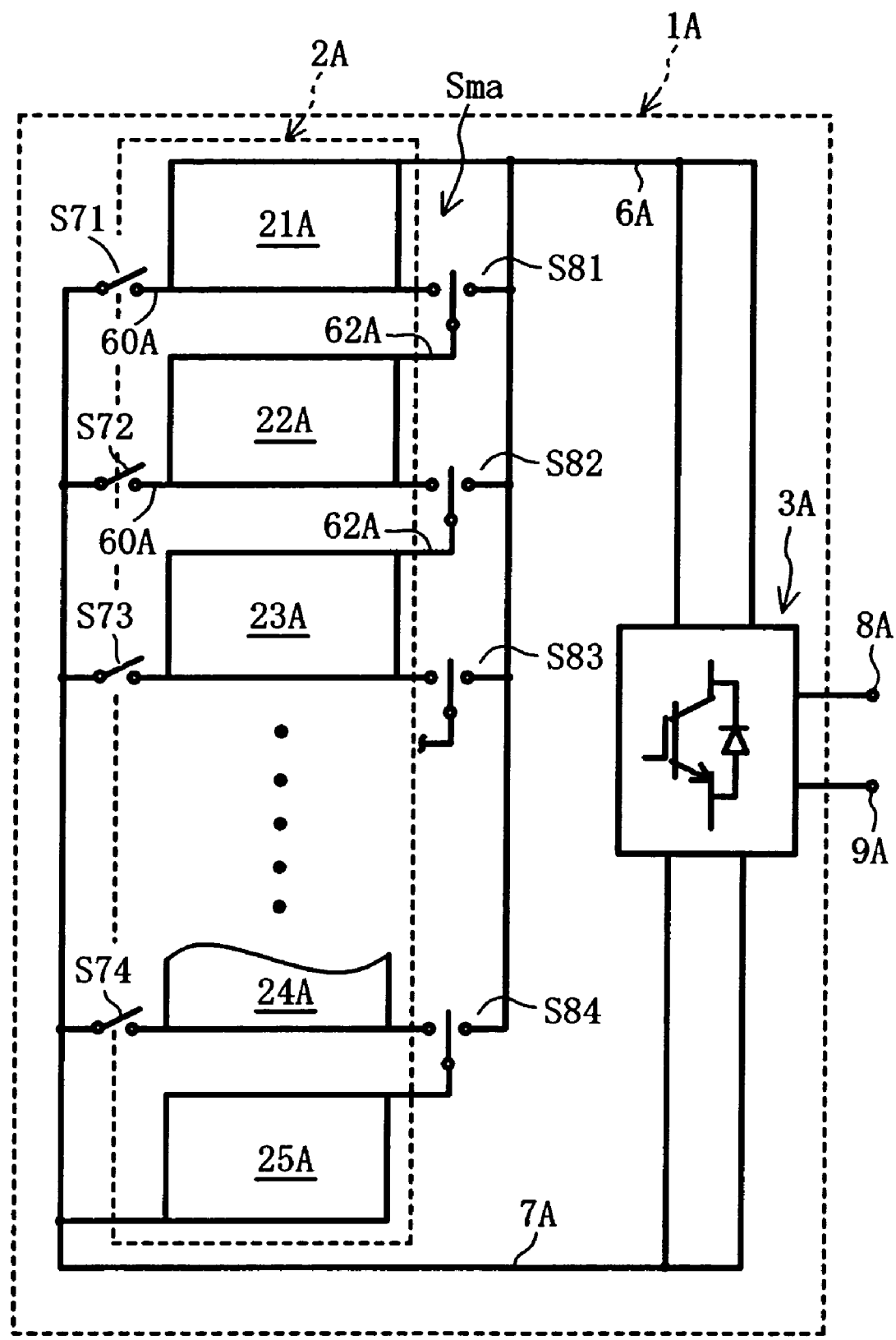
FIG. 18 is a block diagram of the power generating system according to a modified embodiment.

The power generating system 1A in FIG. 18 takes a panel structure assembled on a single panel and can be called a power generation panel.

This power generating system 1A is comprised of 48 power generating modules 21A-25A aligned in line with the same power generation direction, power generator 2A including of the plurality of electric double layer capacitors 29, inverter circuit 3A similar to the inverter circuit 3, positive bus 6A and negative bus 7A at the input side of the inverter circuit 3A, switching mechanism Sma (This is comprised of the switches S71-S74 and switches S81-S84), output terminals 8A and 9A and control device (Not shown). The switching mechanism Sma is to obtain the similar function as the switching mechanism of the power generating system 1 shown in above embodiment of FIG. 1, the switches S71-S74 is, similar to the switches S1-7 to connect/disconnect the negative electrode 60A of the power generating modules 21A-24A to/from the negative bus 7A. The switches S81-S84, similar to the switches S11a-S17a, S11b-S17b, alternatively connect the positive electrode 62A of the power generating modules 22A-25A to the negative electrode 60A of the power generating modules 21A-24A contiguous to the positive electrode or to the positive bus 6A.

Figure 19:
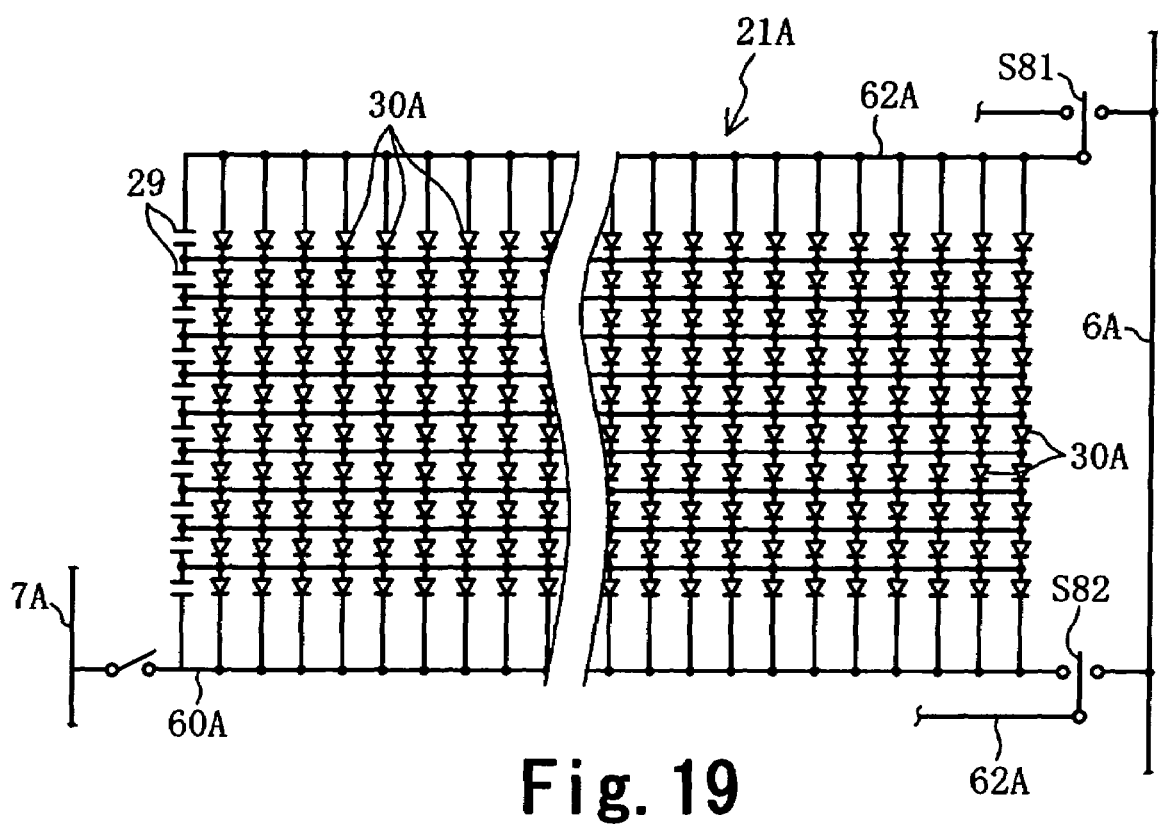
FIG. 19 is a circuit diagram of the power generating modules of FIG. 18;.

Since the power generating modules 21A-24A have the same structure, the power generating modules 21A and electric double layer capacitor 29 will be described. As shown in FIG. 19, the power generating modules 21A has a plurality of power generation units 30A aligned in a 10×100 matrix (10 rows; 100 columns) and connect these power generation units 30A are connected in a series-parallel connection. In this case, one electric double layer capacitor 29 is connected in parallel to 100 of the power generation unit 30A connected in parallel for each row. Therefore, this system has excellent practicality and durability when a part of the power generation units 30A is turned off due to the inconsistent output voltage property or sunlight block, stored DC power is output from the electric double layer capacitor 29 connected in parallel to maximize the power generation property by the power generating modules 21A.

In addition, said "10×100 matrix" is illustrative only, and the number of rows may be 100 or several hundreds of rows since the number of rows is not limited to 10 rows. Similarly, the number of columns may be several dozen, several hundreds or several thousands of columns.

Furthermore, it is not necessary to provide diodes to each of the power generation units 30A for back-flow prevention to facilitate downsizing and decreasing manufacturing cost of the power generating system 1A.

The power generation units 30A itself is similar to the power generation units 30 and the output voltage of each power generation unit 30A is 0.5-0.6 V. Therefore, the maximum output voltage (output during sunny day) of the power generating modules 21A-25A is 5.0-6.0 V, for instance.

By switching the switches S71-S74 on the side of the plurality of negative electrodes and the switches S81-S84 on the side of the plurality of positive electrodes as needed, the power generation modes M1, M2, . . . M48" and "output voltage" as shown in FIG. 20 are designed to be selected.

The technology to configure the power generating modules such as the power generating modules 21A in a panel-like structure is proposed in a plurality of international applications (For instance, PCT/JP00/07360, PCT/JP01/06972, PCT/JP01/09234, PCT/JP01/11416) filed by the present inventor.

The power generating system 1A (power generation panel) as described above can adopt a structure of the power generating system consisting of the plurality of power generating panels, instead of one power generating panel. However, only one set of the control device is sufficient. For instance, as shown in FIG. 21, two panels of the power generating system 1A (power generation panel) are provided in the power generating system and the switch mechanism switching the two power generating system 1A in serial or a parallel connection can be equipped. This switch mechanism is comprised of switches S65 and S66. The switch S65 connects/disconnects to/from the circuit in the figure and, similar to the switches S1-S7, is made from npn type bipolar transistor, for instance. The switch S66 alternatively connects/disconnects one of the contact points and, similar to the switches S11a-S17a and switches S11b-S17b, is made from two npn type bipolar transistors. This switch mechanism switches the connection of the two power generators 1A in series or in parallel. Then, the output terminals 8B and 9B of the power generator made from the two power generators 1A are connected to the AC system, and the power generator system controls its output power to interconnect with the frequency of the AC system and the voltage by the control device.

Figures 20, 21:
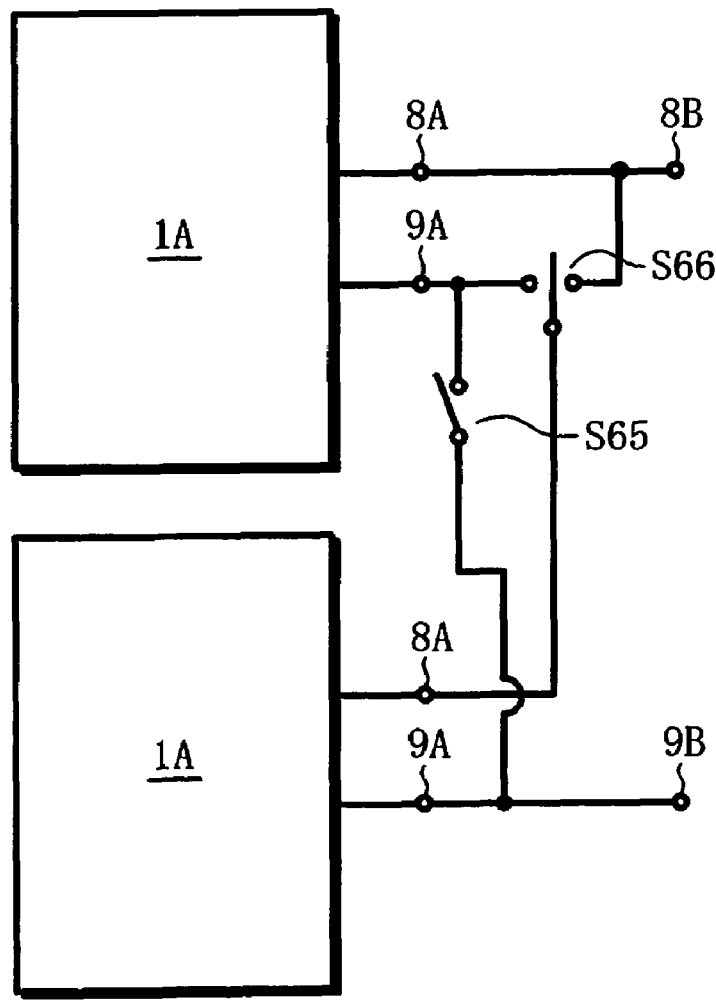
FIG. 20 is a table describing the power generation mode and output voltage in the power generating system of FIG. 18.
FIG. 21 is a block diagram of the power generating system provided with two sets of the power generating system of FIG. 18.
Figures 22, 23:
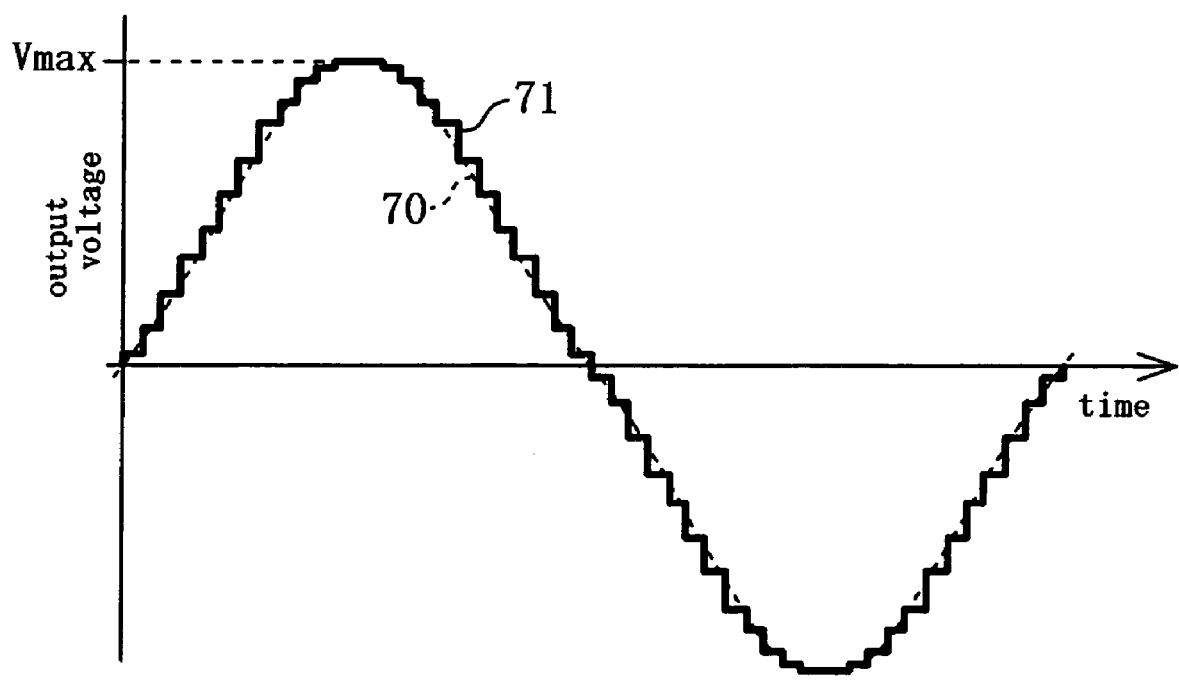
FIG. 22 is a table describing the output voltage in the power generating system of FIG. 21.
FIG. 23 is a diagram of a voltage waveform of the DC power produced from the power generating system and a voltage waveform of single phase AC system.
Figure 24:
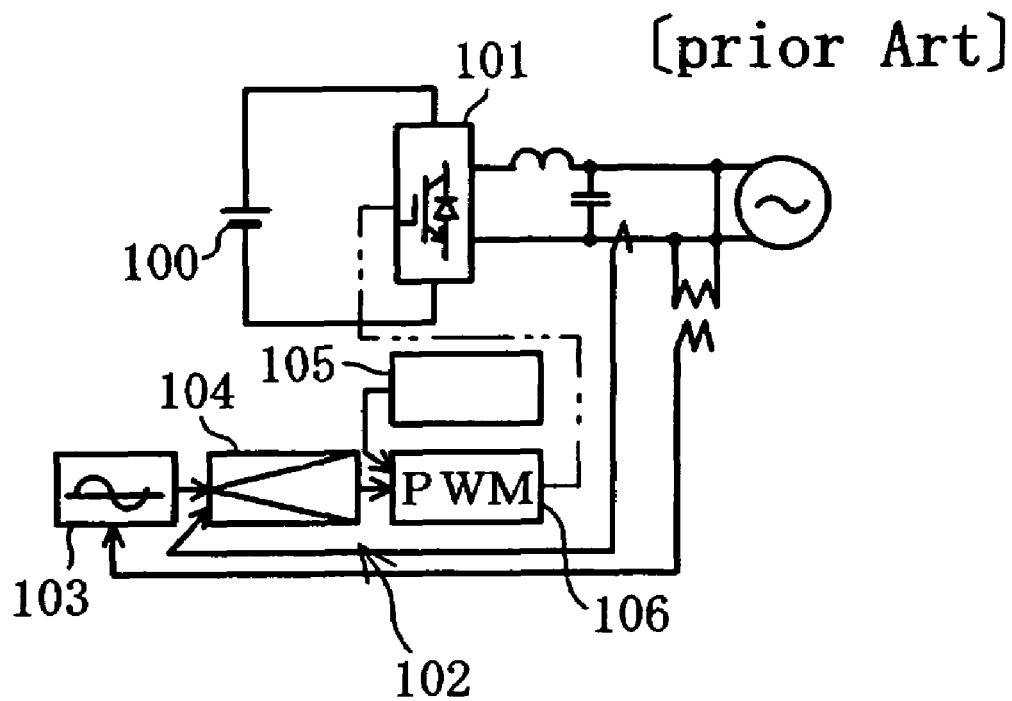
FIG. 24 is a block diagram of the power generation system utilizing the PWM method in the prior art.
Figure 25:
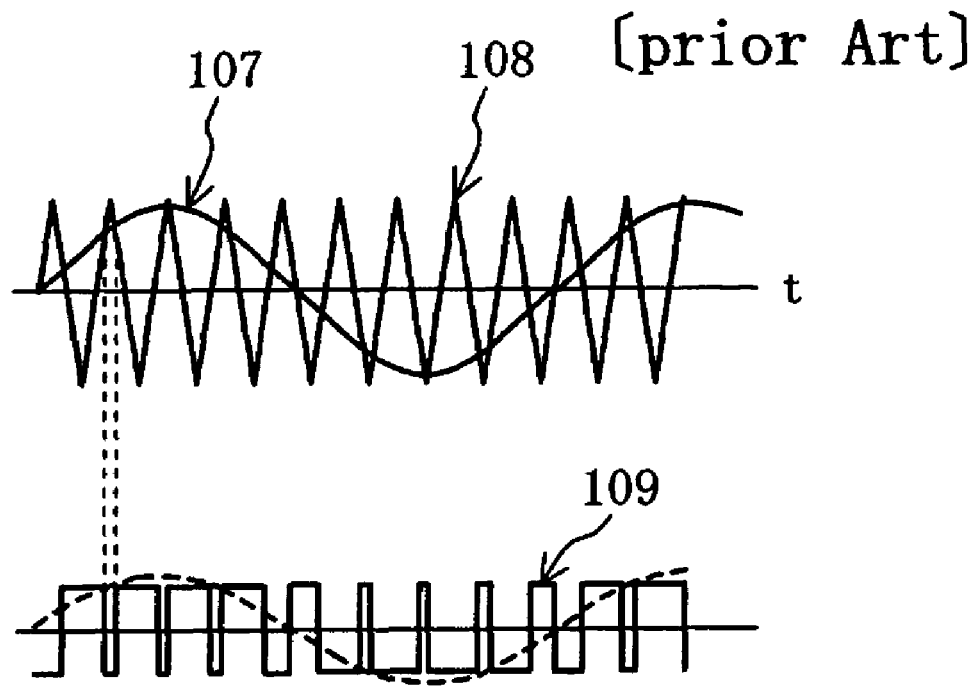
FIG. 25 is time charts showing command voltage sine wave, carrier and square wave AC voltage in the PWM method in FIG. 24.
Figure 26:
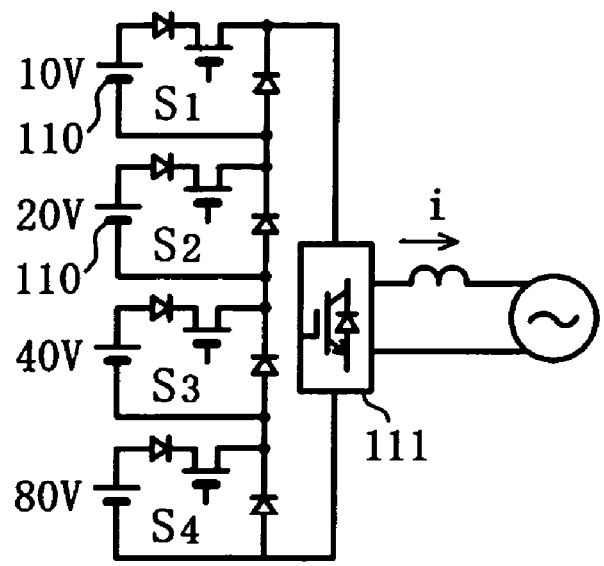
FIG. 26 is a block diagram of the power generation system utilizing the battery switching method in the prior art.
Figure 27:
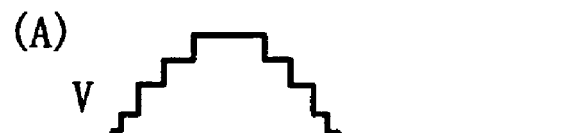
FIG. 27(A) is a diagram of voltage waveform generated by the power generating system in FIG. 26.
FIG. 27(B) is current waveform generated by the power generating system in FIG. 26.
Figure 27:
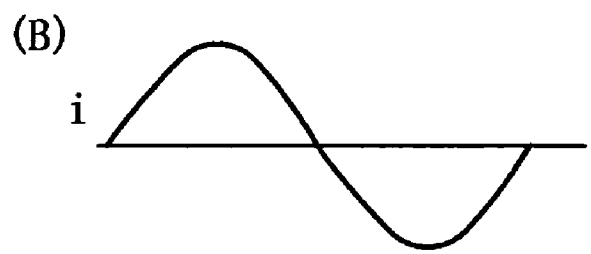

When two of the power generation panels are connected in parallel, the output voltage of the power generating system is switched as shown in FIG. 20. In addition, when the power generation mode of the two power generation panels is arranged to connect in series, the output voltage of the power generating system is switched as shown in FIG. 22.

However, by switching the connecting conditions of the two power generation panels in parallel or in series to adjust the power generation mode of the both power generation panels as needed, the output voltage of the power generator can be switched to 5-6V, 10-12V, 15-18V, 30-36V, 40-48V, 60-92V, 80-96V, 120-144V, 200-240V, 240-288V, 360-432V or 480-576V. However, the above output voltage or the output voltage in FIG. 20 and FIG. 22 are all illustrative of when all power generation units generate the maximum output. As the sunlight is less available on cloudy day, mornings or evenings, when the output voltage of the power generator is decreased, the total output power shown in FIG. 22 will decrease by a few % to several dozen %. With such a power generating system, as shown in FIG. 23, the AC power of the voltage waveforms 71, which changes in multi-levels as show by the solid line, is output for the commercial single phase AC system for the AC waveforms 70 of the AC voltage of the commercial single phase AC system.

In this power generating system 1A, the plurality of semiconductor modules 21A-25A, plurality of electric double layer capacitors 29, inverter circuit 3A and plurality of switches S71-74 and S81-S84 are all assembled into a single panel, and it is possible to configure the inverter circuit and plurality of switches into one semiconductor chip as needed, which simplifies the structure and lower the manufacturing cost.

Furthermore, this system is versatile and flexible by combining various types of a plurality of power generating systems (power generation panel) to generate desired frequency, desired output voltage and desired AC power of the output current.

Although FIG. 21-FIG. 22 are described using the power generating system equipped with the two power generation panels (power generating system) as an example, in reality it is possible to configure it so that the power matching the voltage or the current of the commercial single phase AC system serviced to the home by switching the connection of the plurality of power generation panels parallel or in series.

For the power generating system shown in FIG. 18 or the power generating system shown in FIG. 21, basically the same advantages as the power generating system 1 will be obtained and therefore, the explanation is omitted.

The partially modified example of above embodiment will be explained hereafter.

(1) In the power generating system 1, 1A, although a filter placed on the circuit of the output side of the inverter circuit 3 and impedance were not described, a filter and impedance will be placed as needed in the actual power generation system.

(2) In the inverter circuit 3, 3A, although it was explained using the example when the single phase AC is generated, it is possible that DC power generated by the power generator 2, 2A may be converted to three-phase AC by the inverter circuit, in this case, the DC power generated by the power generator will be converted to AC power corresponding to each phase of the three-phase AC.

(3) The entire power generating system 1 could be designed as a single plate or panel-like structure. The power generating system shown in FIG. 18 could be designed, for instance, as a plurality of single plates or panel-like structure of the power generating system of as shown in FIG. 21.

(4) It is not necessary to manufacture individually each of the plurality of power generating modules 21-28, 21A-25A, it can be manufactured as an integrated form in overall. For instance, it is possible that the plurality of power generating modules as shown in FIG. 18 are designed to be made of a seeming single power generating module to take a constitution of the plurality of power generating modules as shown in FIG. 18 in terms of electrical circuit.

(5) Although the power generating system 1, 1A was described using the separately-excited type power generating system interconnected to an external AC system as an example, it is natural that the present invention is applicable to a self-excited type power generating system containing the means to generate standard AC.

(6) Above power generating system 1, 1A, can be designed so that on/off switches are connected in parallel to the electric double layer capacitors 29a and 29b at the parallel connecting position of each of the electric double layer capacitors 29a and 29b and the electric double layer capacitors 29a and 29b output DC only when the on/off switches are switched to ON side as needed.

(7) The electric storage means is not limited to the electric double layer capacitors 29a and 29b, and various electric means capable of storing generated power such as electrolytic capacitor, secondary battery and battery with large electric storage capacity, can be used.

What is claimed is:

1. A power generating system comprising:
    a power generator generating DC power;
    an inverter circuit for converting said DC power generated by said power generator into AC power, said inverter circuit having an input side and an output side;
    said power generator having power generating modules each comprising solar power generating granular cells and electric storage means connected in parallel within each of said power generating modules;
    said solar power generating granular cells each having a positive output electrode and a negative output electrode;
    a positive bus and a negative bus connected to said input side of said inverter circuit;
    said power generating modules each having:
        said solar power generating granular cells physically arranged in a matrix having rows and columns wherein each of said solar power generating granular cells is disposed in both one of said rows and one of said columns;
        said solar power generating granular cells in each of said rows being electrically connected in parallel with each other and one of said electric storage means;
        said solar power generating granular cells in each of said columns being electrically connected in series, said columns having aligned first ends whereat ones of said positive output electrodes of ones of said solar power generating granular cells disposed at said first ends are disposed, and said columns having aligned second ends whereat ones of said negative output electrodes of ones of said solar power generating granular cells disposed at said second ends are disposed;
        a positive module electrode electrically connected to said ones of said positive output electrodes at said first ends of said columns; and
        a negative module electrode electrically connected to said ones of said negative output electrodes at said second ends of said columns;
    a plurality of first switch means for selectively connecting at least all but one of said positive module electrodes of said power generating modules to said positive bus;
    a plurality of second switch means for selectively connecting said positive module electrodes of said power generating modules to said negative module electrodes of adjacent ones of said power generating modules so as to selectively effect serial connection of said power generating modules;
    a plurality of third switch means for selectively connecting at least all but one of said negative module electrodes of said power generating modules to said negative bus;
    a control device for controlling said first, second and third switch means; and
    said power generator and said inverter circuit being mounted in a common power generating panel.

2. The power generating system according to claim 1, further comprising:
    a first substrate having an upper surface, said upper surface having mounted thereon said power generating modules, said first switch means, said second switch means, and said third switch means;
    a second substrate having mounted thereon said inverter circuit and said control device;
    a main case housing said first substrate and said second substrate:
    a cover member covering an opening of said main case;
    said electric storage means being disposed between said first substrate and said second substrate; and
    said electric storage means, said first substrate and said second substrate being embedded in transparent resin inside said main case with said cover member installed thereon panel.

3. The power generating system according to claim 1, wherein:
    said first, second and third switch means are individually comprised of semiconductor switching elements; and
    said control device is configured to switch an output voltage of said power generator in multi-levels by selectively switching said first, second and third switch means.

4. The power generating system according to claim 3, wherein:
    said power generating modules are divided into a plurality of groups;
    said control device controls said first and third switch means to connect in parallel said groups of said power generating models using said positive bus and said negative bus; and
    said second switch means connect said power generating modules in respective ones of said groups in series.

5. The power generating system according to claim 3, wherein said inverter circuit comprises semiconductor switching elements and said semiconductor switching elements are controlled by said control device.

6. The power generating system according to claim 3, further comprising voltage detection means for detecting a voltage of an AC power system to which said power generation system supplies power thereto, wherein said control device controls said first, second and third switch means and said semiconductor switching elements of said inverter circuit based on detection signals of said voltage detection means.

7. The power generating system according to claim 1, wherein said power generator includes fuel cells each of which is layered with a plurality of single cells and said power generation unit is comprised of said single cells.

8. The power generating system according to claim 1, wherein said electric storage means is an electric double layer capacitor.

9. The power generating system according to claim 1, wherein said electric storage means is a secondary battery.

10. The power generating system according to claim 1, wherein for each of said power generating modules:
    said solar power generating granular cells in each of said rows are fixedly electrically connected in parallel with each other and one of said electric storage means;
    said solar power generating granular cells in each of said columns are fixedly electrically connected in series;
    said electric storage means are fixedly connected in series;
    said positive module electrode is fixedly electrically connected to said ones of said positive output electrodes at said first ends of said columns; and said negative module electrode is fixedly electrically connected to said ones of said negative output electrodes at said second ends of said columns.

11. The power generating system according to claim 10, further comprising:
- a first substrate having an upper surface, said upper surface having mounted thereon said power generating modules, said first switch means, said second switch means, and said third switch means;
- a second substrate having mounted thereon said inverter circuit and said control device;
- a main case housing said first substrate and said second substrate;
- a cover member covering an opening of said main case;
- said electric storage means being disposed between said first substrate and said second substrate; and
- said electric storage means, said first substrate and said second substrate being embedded in transparent resin inside said main case with said cover member installed thereon to form said common power generating panel.

12. The power generating system according to claim 10, wherein:
- said first, second and third switch means are individually comprised of semiconductor switching elements; and
- said control device is configured to switch an output voltage of said power generator in multilevels by selectively switching said first, second and third switch means.

13. The power generating system according to claim 12, wherein:
- said power generating modules are divided into a plurality of groups;
- said control device controls said first and third switch means to connect in parallel said groups of said power generating modules using said positive bus and said negative bus; and
- said second switch means connect said power generating modules in respective ones of said groups in series.

14. The power generating system according to claim 12, wherein said inverter circuit comprises semiconductor switching elements and said semiconductor switching elements are controlled by said control device.

15. The power generating system according to claim 12, further comprising voltage detection means for detecting a voltage of an AC power system to which said power generation system supplies power thereto, wherein said control device controls said first, second and third switch means and said semiconductor switching elements of said inverter circuit based on detection signals of said voltage, detection means.

16. The power generating system according to claim 10, wherein said power generator includes fuel cells each of which is layered with a plurality of single cells and said power generation unit is comprised of said single cells.

17. The power generating system according to claim 10, wherein said electric storage means is an electric double layer capacitor.

18. The power generating system according to claim 10, wherein said electric storage means is a secondary battery.

* * * * *